United States Patent
Zhang et al.

(10) Patent No.: US 11,125,884 B2
(45) Date of Patent: Sep. 21, 2021

(54) POSITIONING METHOD IN MOBILE NETWORK, SERVER, BASE STATION, MOBILE TERMINAL, AND SYSTEM

(71) Applicant: HUAWEI TECHNOLOGIES CO., LTD., Guangdong (CN)

(72) Inventors: Yi Zhang, Beijing (CN); Hui Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 209 days.

(21) Appl. No.: 15/963,743

(22) Filed: Apr. 26, 2018

(65) Prior Publication Data

US 2018/0246219 A1 Aug. 30, 2018

Related U.S. Application Data

(63) Continuation of application No. PCT/CN2015/093279, filed on Oct. 29, 2015.

(51) Int. Cl.
*G01S 19/07* (2010.01)
*G01S 19/43* (2010.01)

(52) U.S. Cl.
CPC .......... *G01S 19/073* (2019.08); *G01S 19/071* (2019.08); *G01S 19/43* (2013.01)

(58) Field of Classification Search
CPC ...... G01S 19/07; G01S 19/071; G01S 19/073; G01S 19/43
See application file for complete search history.

(56) References Cited

U.S. PATENT DOCUMENTS

| | | | | |
|---|---|---|---|---|
| 6,100,842 A | * | 8/2000 | Dreier | G01S 19/071 342/357.41 |
| 6,859,729 B2 | | 2/2005 | Breakfield et al. | |
| 6,980,131 B1 | * | 12/2005 | Taylor | G08G 1/20 340/902 |

(Continued)

FOREIGN PATENT DOCUMENTS

| | | |
|---|---|---|
| CN | 1897748 A | 1/2007 |
| CN | 101008671 A | 8/2007 |

(Continued)

OTHER PUBLICATIONS

GNSS Solutions: Virtual Reference Stations, L. Kislig, InsideGNSS, p. 28-31, Jul./Aug. 2011 (Year: 2011).*

(Continued)

*Primary Examiner* — Bernarr E Gregory
*Assistant Examiner* — Fred H Mull
(74) *Attorney, Agent, or Firm* — Womble Bond Dickinson (US) LLP

(57) ABSTRACT

Embodiments of the present invention provide a positioning method, the positioning method includes: obtaining, by the server, first location information, where the first location information is used to indicate a location of the base station; obtaining, by the server, correction information for the base station according to the location of the base station; and sending, by the server, the correction information to the base station, so that the base station forwards the correction information to the mobile terminal, and the mobile terminal determines a location of the mobile terminal according to the correction information.

4 Claims, 14 Drawing Sheets

(56) References Cited

U.S. PATENT DOCUMENTS

| | | | |
|---|---|---|---|
| 2005/0064878 A1 | 3/2005 | O'Meagher | |
| 2007/0037588 A1* | 2/2007 | Mohi | G01S 19/51 |
| | | | 455/456.5 |
| 2012/0256788 A1 | 10/2012 | Ashjaee et al. | |
| 2015/0185331 A1 | 7/2015 | Dai et al. | |
| 2016/0070001 A1* | 3/2016 | Krantz | G01S 19/36 |
| | | | 342/357.72 |
| 2018/0003507 A1* | 1/2018 | Arslan | G01S 19/48 |

FOREIGN PATENT DOCUMENTS

| | | | |
|---|---|---|---|
| CN | 101464688 A | | 6/2009 |
| CN | 101661097 A | | 3/2010 |
| CN | 102540225 A | | 7/2012 |
| CN | 102761961 A | | 10/2012 |
| CN | 103299205 A | | 9/2013 |
| CN | 103364815 A | | 10/2013 |
| CN | 103649776 A | | 3/2014 |
| CN | 104796982 A | | 7/2015 |
| CN | 105353391 A | * | 2/2016 |
| WO | 2009126587 A1 | | 10/2009 |

OTHER PUBLICATIONS

English translation of CN 104796982 A (Year: 2021).*
English translation of CN 105353391A (Year: 2021).*
Brown et al, RTK Rover Performance using the Master-Auxiliary Concept. Journal of Global Positioning Systems (2006) vol. 5, No. 1-2:135-L44.
Enabler Test Specification for SUPL V2.0 Candidate Version 2.0—Aug. 18, 2009, Open Mobile Alliance OMA-ETS-SUPL-V2_0-20090818-C, Open Mobile Alliance, 137 pages.
Takasu, Tomoji; A.4 RTK-GPS and Network RTK-GPS Positioning Technology, 2011, with partial English translation, total 15 pages.

* cited by examiner

POSITIONING METHOD IN MOBILE NETWORK, SERVER, BASE STATION, MOBILE TERMINAL, AND SYSTEM

CROSS-REFERENCE TO RELATED APPLICATIONS

This application is a continuation of International Application No. PCT/CN2015/093279, filed on Oct. 29, 2015, the disclosure of which is hereby incorporated by reference in its entirety.

TECHNICAL FIELD

Embodiments of the present invention relate to the communications field, and more specifically, to a positioning method in a mobile network, a server, a base station, a mobile terminal, and a system.

BACKGROUND

In a Long Term Evolution (LTE) system, standard positioning manners mainly include: assisted global navigation satellite system (A-GNSS) positioning, observed time difference of arrival (OTDOA) positioning, and enhanced cell ID (e-CID) positioning. However, none of these three positioning manners can meet a high-precision positioning requirement.

Currently, in a national surveying and mapping industry, a real-time kinematic (RTK) technology is used to correct GNSS positioning information that uses a carrier phase measurement technology, to obtain a positioning result with higher precision. However, a network RTK positioning technology needs to be implemented based on a continuously operating reference stations (CORS) system, but a current CORS system is applied only to a surveying and mapping field, has a limited broadcast capability, and cannot accommodate massive common users of a mobile network.

SUMMARY

Embodiments of the present invention provide a positioning method in a mobile network, a server, a base station, a mobile terminal, and a system, so that high-precision positioning can be performed on the mobile terminal.

According to a first aspect, a positioning method in a mobile network is provided. The positioning method includes: obtaining, by a server, first location information, where the first location information is used to indicate a location of a base station; obtaining, by the server, correction information for the base station according to the location information, where the correction information is determined according to a real-time kinematic RTK observation value obtained by a continuously operating reference stations CORS system; and sending, by the server, the correction information to the base station, so that the base station forwards the correction information to a mobile terminal, and the mobile terminal corrects, according to the correction information, positioning information obtained from a positioning system by the mobile terminal, to determine a location of the mobile terminal.

According to one embodiment, the correction information includes a Master-Auxiliary Concept (MAC) unit differential correction. The server determines, according to the first location information, a MAC unit to which the base station belongs in the CORS system. The server determines a MAC unit differential correction for the MAC unit from a MAC unit differential correction set according to the MAC unit. The MAC unit differential correction set includes multiple MAC unit differential corrections sent by the CORS system to the server, the multiple MAC unit differential corrections are determined by the CORS system according to the RTK observation value, and each of the multiple MAC unit differential corrections carries location information of a unit that the MAC unit differential correction is for. The server sends the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

According to one embodiment, the correction information includes a MAC unit differential correction. The server determines, according to the location of the base station, a MAC unit to which the base station belongs in the CORS system. The server determines a target RTK observation value for the MAC unit from an RTK observation value set according to the MAC unit. The RTK observation value set includes multiple RTK observation values sent by the CORS system to the server, and each of the multiple RTK observation values carries location information of a location that the RTK observation value is for. The server determines the MAC unit differential correction according to the target RTK observation value. The server sends the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

According to one embodiment, the base station includes M first base stations, where M is less than or equal to a preset threshold, the preset threshold is determined according to a processing capability of the CORS system, the M first base stations are all or some of base stations within a serving range of the server, the first location information includes location information of the first base station, and the correction information includes a first virtual reference station (VRS) differential correction. The server sends a request message to the CORS system. The request message is used for requesting a first VRS differential correction for the first base station from the CORS system, and the request message carries the location information of the first base station. The server receives the first VRS differential correction sent by the CORS system, and the first VRS differential correction is determined by the CORS system according to the location information of the first base station and the RTK observation value. The server sends the first VRS differential correction to the base station, so that the base station forwards the first VRS differential correction to the mobile terminal, and the mobile terminal corrects, according to the first VRS differential correction, the positioning information obtained from the positioning system by the mobile terminal, to determine the location of the mobile terminal. Therefore, in this embodiment of the present invention, correction information is determined for the first base station by requesting the CORS system, and correction information for a second base station is determined according to the correction information for the first base station, so that working pressure of the CORS system is reduced.

According to one embodiment, the base station includes the M first base stations and a second base station, and locations of the M first base stations are determined according to locations of the base stations within the serving range of the server.

According to one embodiment, the correction information further includes a second VRS differential correction, and the first location information further includes location information of the second base station. The server determines, according to a location of the second base station, at least three target first base stations that are closest to the second base station. The server determines the second VRS differential correction according to at least three first VRS differential corrections for the at least three target first base stations, and each of the at least three target first base stations is in one-to-one correspondence with each of the at least three first VRS differential corrections. The server sends the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the second mobile terminal.

According to one embodiment, the correction information includes a VRS differential correction. The server determines at least three target RTK observation values for the base station from an RTK observation value set according to the first location information. The RTK observation value set includes multiple RTK observation values sent by the CORS system to the server, and each of the multiple RTK observation values carries location information of a location that the RTK observation value is for. The server determines the VRS differential correction according to the at least three target RTK observation values. The server sends the VRS differential correction to the base station, so that the base station forwards the VRS differential correction to the mobile terminal, and the mobile terminal corrects, according to the VRS differential correction, the positioning information obtained from the positioning system by the mobile terminal, to determine the location of the mobile terminal.

According to a second aspect, a positioning method in a mobile network is provided. The positioning method includes: receiving, by a base station, correction information sent by a server, where the correction information is determined according to a real-time kinematic observation value obtained by a continuously operating reference stations system; and sending, by the base station, the correction information to a mobile terminal, so that the mobile terminal corrects, according to the correction information, positioning information obtained from a positioning system by the mobile terminal, to determine a location of the mobile terminal.

According to one embodiment, the base station sends a cell broadcast message, where the cell broadcast message carries the correction information, so that the mobile terminal corrects, according to the correction information, the positioning information obtained from the positioning system by the mobile terminal, to determine the location of the mobile terminal. In an embodiment, the cell broadcast message includes a system information block SIB message.

According to a third aspect, a positioning method in a mobile network is provided. The positioning method includes: obtaining, by a mobile terminal, positioning information for the mobile terminal from a positioning system; receiving, by the mobile terminal, correction information sent by a base station, where the correction information is determined according to a real-time kinematic observation value; and correcting, by the mobile terminal, the positioning information according to the correction information, to determine a location of the mobile terminal.

According to a fourth aspect, a server is provided. The server includes an obtaining module and a sending module. The obtaining module and the sending module are configured to perform the method in the first aspect.

According to a fifth aspect, a base station is provided. The base station includes a receiving module and a sending module. The receiving module and the sending module are configured to perform the method in the second aspect.

According to a sixth aspect, a mobile terminal is provided. The mobile terminal includes an obtaining module, a receiving module, and a determining module. The obtaining module, the receiving module, and the determining module are configured to perform the method in the third aspect.

According to a seventh aspect, a system is provided. The system includes the server in the fourth aspect, the base station in the fifth aspect, and the mobile terminal in the sixth aspect. In addition, the server is specifically configured to perform the method in the first aspect, the base station is specifically configured to perform the method in the second aspect, and the mobile terminal is specifically configured to perform the method in the third aspect.

According to an eighth aspect, a server is provided. The server includes a receiver, a transmitter, a memory, a processor, and a bus system. The receiver, the transmitter, the processor, and the memory are connected to each other by using the bus system. The memory is configured to store an instruction. The processor is configured to execute the instruction stored in the memory, so as to control the receiver to receive a signal and control the transmitter to send a signal. The processor, the receiver, and the transmitter are specifically configured to perform the method in the first aspect.

According to a ninth aspect, a base station is provided. The base station includes a receiver, a transmitter, a memory, a processor, and a bus system. The receiver, the transmitter, the processor, and the memory are connected to each other by using the bus system. The memory is configured to store an instruction. The processor is configured to execute the instruction stored in the memory, so as to control the receiver to receive a signal and control the transmitter to send a signal. The processor, the receiver, and the transmitter are specifically configured to perform the method in the second aspect.

According to a tenth aspect, a mobile terminal is provided. The mobile terminal includes a receiver, a transmitter, a memory, a processor, and a bus system. The receiver, the transmitter, the processor, and the memory are connected to each other by using the bus system. The memory is configured to store an instruction. The processor is configured to execute the instruction stored in the memory, so as to control the receiver to receive a signal and control the transmitter to send a signal. The processor, the receiver, and the transmitter are specifically configured to perform the method in the third aspect.

According to the positioning method in a mobile network, the server, the base station, the mobile terminal, and the system in the embodiments of the present invention, a server is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

User equipment (UE), also referred to as a mobile terminal (Mobile Terminal), a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges a voice and/or data with the radio access network.

A base station may be a base transceiver station (BTS) in GSM or CDMA, or may be a nodeB (NodeB) in WCDMA, or may be an evolved NodeB (e-NodeB) in LTE. This is not limited in the present invention.

Figure 1:
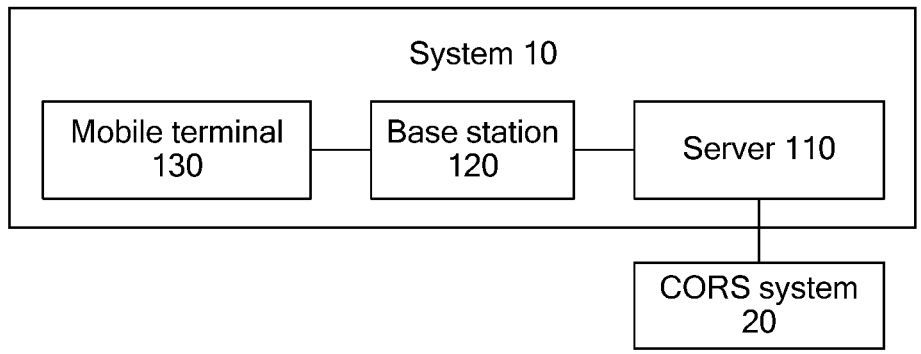
FIG. 1 is a schematic diagram of an architecture of a system applicable to a positioning method in a mobile network according to an embodiment of the present invention.

FIG. 1 is a schematic diagram of an architecture of a system 10 applicable to a positioning method in a mobile network according to an embodiment of the present invention. As shown in FIG. 1, the system 10 may include at least one server 110 that is connected to a CORS system 20, at least one base station 120, and a mobile terminal 130 in a serving cell of the base station 120. The mobile terminal 130 supports a GNSS observation technology. The system 10 is connected to the CORS system 20 by using the server 110, and obtains correction information or an RTK observation value from the CORS system 20.

It should be understood that a GNSS satellite is merely described as an example, and all satellites used for observing a location of an RTK reference source in real time or other positioning devices fall within the protection scope of the present invention.

In this embodiment of the present invention, the mobile terminal 130 may be a mobile terminal that supports a GNSS carrier phase observation technology. It should be understood that, as one of GNSS observation technologies, the GNSS carrier phase observation technology is described as an example in this embodiment. All mobile terminals that support the GNSS observation technology may correct GNSS positioning information by using correction information obtained by resolving an RTK observation value, and correct positioning information obtained from a GNSS positioning system by the mobile terminal. It should be further understood that the GNSS positioning system is merely described as an example, and shall not constitute a limitation on the present invention. The present invention is not limited thereto. Another positioning system applied to the mobile network falls within the protection scope of the present invention.

The foregoing system 10 applicable to a positioning method in a mobile network according to an embodiment of the present invention and a central station in the CORS system 20 may be collectively referred to as an enhanced-network RTK (E-NRTK) positioning system.

It should be noted that the RTK positioning technology is a real-time kinematic positioning technology based on a carrier phase observation value. In the RTK positioning technology, a GNSS reference station (or a reference station) needs to be constructed, GNSS satellite data needs to be continuously observed, and an observation result needs to be delivered to a mobile station (that is, a mobile terminal). The mobile station resolves a precise location of the mobile station according to data of the reference station and a GNSS observation result of the mobile station. Precision may reach a centimeter level. Multiple GNSS reference stations that support RTK are connected to form a network by using a network technology and summarized to a central station (for example, the CORS central station), and the central station serves the mobile station. This is a network RTK technology.

It should be understood that the E-NRTK positioning system is merely described as an example, and all positioning methods in which the network RTK technology is applied to the mobile network fall within the protection scope of the present invention.

For ease of understanding and description, the positioning method in a mobile network in the embodiments of the present invention is described in detail below by using the E-NRTK positioning system as an example. It should be understood that, as a positioning system, the E-NRTK positioning system is merely described as an example, and shall not constitute any limitation on the present invention. Any positioning method in which the network RTK positioning technology is applied to the mobile network falls within the protection scope of the present invention.

It should be noted that a schematic diagram of an architecture of the foregoing system 10 applicable to a positioning method in a mobile network according to an embodiment of the present invention is merely described as an example, and the present invention is not limited thereto. For example, the system 10 may further include more base stations 120, mobile terminals 130, or the like.

With reference to FIG. 2 to FIG. 10, the positioning method in a mobile network according to the embodiments of the present invention is described in detail below.

Figure 2:
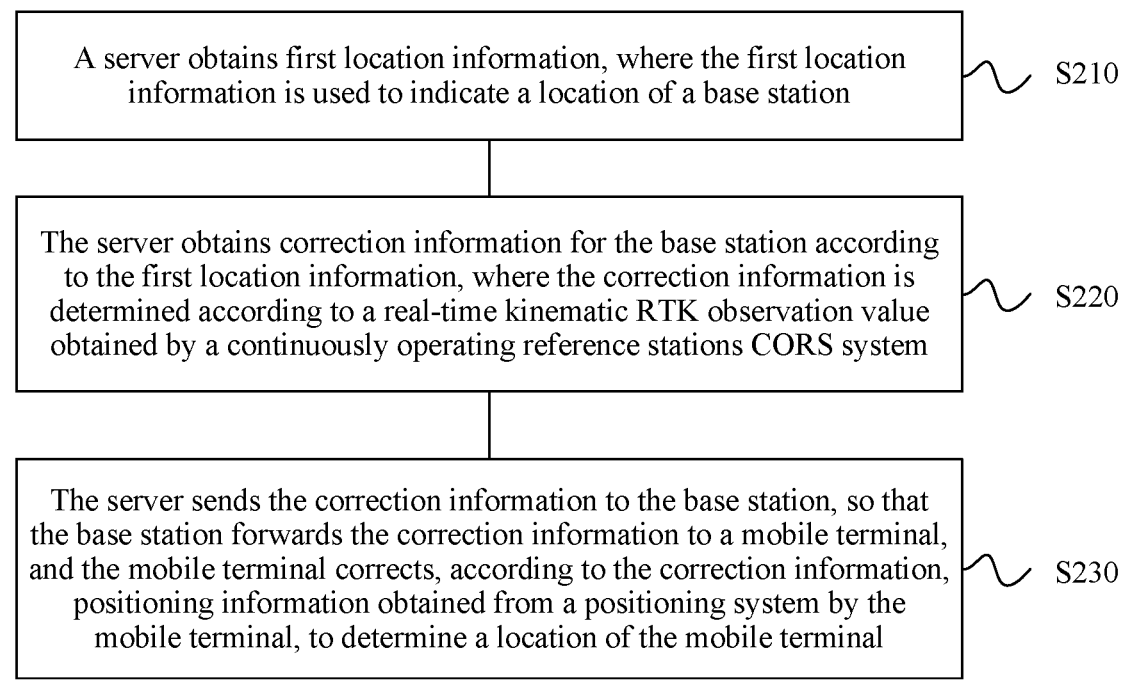
FIG. 2 is a schematic flowchart of a positioning method in a mobile network according to an embodiment of the present invention.

FIG. 2 is a schematic flowchart of a positioning method 200 in a mobile network according to an embodiment of the present invention that is described from a perspective of a server. As shown in FIG. 2, the positioning method 200 includes the following operations.

Operation S210. The server obtains first location information, where the first location information is used to indicate a location of a base station.

Operation S220. The server obtains correction information for the base station according to the first location information, where the correction information is determined according to a real-time kinematic RTK observation value obtained by a continuously operating reference stations CORS system.

Operation S230. The server sends the correction information to the base station, so that the base station forwards the correction information to a mobile terminal, and the mobile terminal corrects, according to the correction information, positioning information obtained from a positioning system by the mobile terminal, to determine a location of the mobile terminal.

In this embodiment of the present invention, as an example instead of a limitation, the CORS system may be the CORS system 20 in FIG. 1, the server may be the server 110 in FIG. 1, the base station may be the base station 120 in FIG. 1, and the mobile terminal may be the mobile terminal 130 in FIG. 1.

In operation S210, the server may store location information (that is, the first location information) of a base station in a coverage area of the server in advance. The first location information may be location coordinates planned during installation of the base station. Alternatively, the base station may be a base station that supports the GNSS, and the first location information may be positioning information received from the GNSS by the base station. Alternatively, the server may send a location information request to the base station, to request the base station to report location information to the server. In this embodiment of the present invention, the first location information may be used to indicate the location of the base station, so that the server obtains the corresponding correction information according to the location of the base station.

In operation S220, the server may obtain the correction information for the base station from a CORS central station in the CORS system according to the first location information, and the correction information is determined by the CORS central station according to the RTK observation value. Alternatively, the server may obtain an RTK observation value for the base station from a reference station in the CORS system according to the first location information, and resolve the RTK observation value, to determine the correction information.

Optionally, the correction information or the RTK observation value that is sent by the CORS system and received by the server may be carried in a Networked Transport of Radio Technical Commission for Maritime services (RTCM) via Internet Protocol (Networked Transport of RTCM via Internet Protocol, "Ntrip" for short) message. It should be understood that the Ntrip message is merely described as an example, and the present invention is not limited thereto. Alternatively, the correction information or the RTK observation value may be carried in another message sent by the CORS system to the server, or a transport protocol between the CORS system and the server is not limited to Ntrip. This is not particularly limited in the present invention.

It should be noted that, as a function module used for positioning, the server may be a gateway mobile location center (GMLC), an evolved serving mobile location center (E-SMLC), or the like. Alternatively, another network element may be used for performing resolving processing on the RTK observation value and uniformly managing the correction information. This is not particularly limited in the present invention. In addition, the server may be disposed in a core network, or may be disposed in the base station. This is not particularly limited in the present invention.

In operation S230, the server sends the correction information to the base station. The base station may send the correction information to the mobile terminal. For example, the server may carry the correction information by sending a message to the base station, or the base station may send the correction information to the mobile terminal in a form of a cell broadcast message.

In this embodiment of the present invention, when a distance between the mobile terminal and the base station falls within a preset range (or the mobile terminal is in a preset range of the base station), the correction information is used for correcting GNSS positioning information of the mobile terminal. The preset range may be an effective range covered by the correction information. The effective range of the correction information is far greater than a radio network coverage area of the base station. That is, within the preset range, a positioning result obtained by performing correction by using the correction information may still keep relatively high precision. Alternatively, within the effective range, impact exerted on a positioning result by the distance between the mobile terminal and the base station is merely at a decimeter level. In other words, the correction information may be used for correcting the GNSS positioning information of the mobile terminal that is in the radio network coverage area of the base station.

It should be understood that the cell broadcast message is merely described as an example, and shall not constitute any limitation on the present invention. The present invention is not limited thereto. A method in which the base station sends the correction information to the mobile terminal in a form of another message falls within the protection scope of the present invention. This is not particularly limited in the present invention.

According to the positioning method in this embodiment of the present invention, a server is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Optionally, the correction information includes a Master-Auxiliary Concept MAC unit differential correction.

That the server obtains correction information for the base station according to the first location information, where the correction information is determined according to an RTK observation value obtained by a CORS system includes:
  determining, by the server according to the first location information, a MAC unit to which the base station belongs in the CORS system; and
  determining, by the server, a MAC unit differential correction for the MAC unit from a MAC unit differential correction set according to the MAC unit, where the MAC unit differential correction set includes multiple MAC unit differential corrections sent by the CORS system to the server, the multiple MAC unit differential corrections are determined by the CORS system according to the RTK observation value, and each of the multiple MAC unit differential corrections carries location information of a unit that the MAC unit differential correction is for.

That the server sends the correction information to the base station, so that the base station forwards the correction information to a mobile terminal, and the mobile terminal corrects, according to the correction information, positioning information obtained from a positioning system by the mobile terminal, to determine a location of the mobile terminal includes:
  sending, by the server, the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Specifically, the server may receive all correction information sent by the CORS central station. When the CORS system supports resolving that is performed by using a Master-Auxiliary Concept (MAC) technology, the correction information received by the server is the MAC unit differential correction set. The MAC unit differential correction set includes MAC unit differential corrections of all MAC units in a coverage area of the CORS system. The server may determine, according to the first location information or the location of the base station, the MAC unit to which the base station belongs, and then send the MAC unit differential correction for the MAC unit to the base station according to the MAC unit, that is, a MAC unit differential correction for the base station.

In this embodiment of the present invention, each MAC unit differential correction in the MAC unit differential correction set carries a unit attribute of a unit that the MAC unit differential correction is for. The unit attribute includes information such as a range of the MAC unit. The range of the MAC unit may be location information of the MAC unit or other information used to indicate the range of the MAC unit. The server may determine, according to the unit attribute carried in each MAC unit differential correction in the MAC unit differential correction set, the MAC unit to which the base station belongs. Alternatively, the server may obtain a unit list of the MAC unit from the CORS system in advance. The unit list includes a unit attribute of each MAC unit. The server determines, according to the unit list, the MAC unit to which the base station belongs.

Optionally, that the server sends the correction information to the base station includes:
  sending, by the server, a Long Term Evolution Positioning Protocol A LPPa message to the base station, where the LPPa message carries the correction information.

In this embodiment of the present invention, as a communications protocol between the base station and the server, the LPPa message is used to carry positioning information transmitted between the base station and the server.

Correspondingly, as a communications protocol between the base station and the mobile terminal, an LTE Positioning Protocol (LPP) message is used for carrying any positioning information transmitted between the base station and the mobile terminal.

It should be noted that the foregoing LPPa message used to carry the positioning information between the base station and the server and the LPP message used to carry the positioning information between the mobile terminal and the base station are merely described as examples, and shall not constitute any limitation on the present invention. Alternatively, the positioning information between the base station and the server, and the positioning information between the mobile terminal and the server may be carried by using another message. This is not particularly limited in the present invention.

Figure 3:
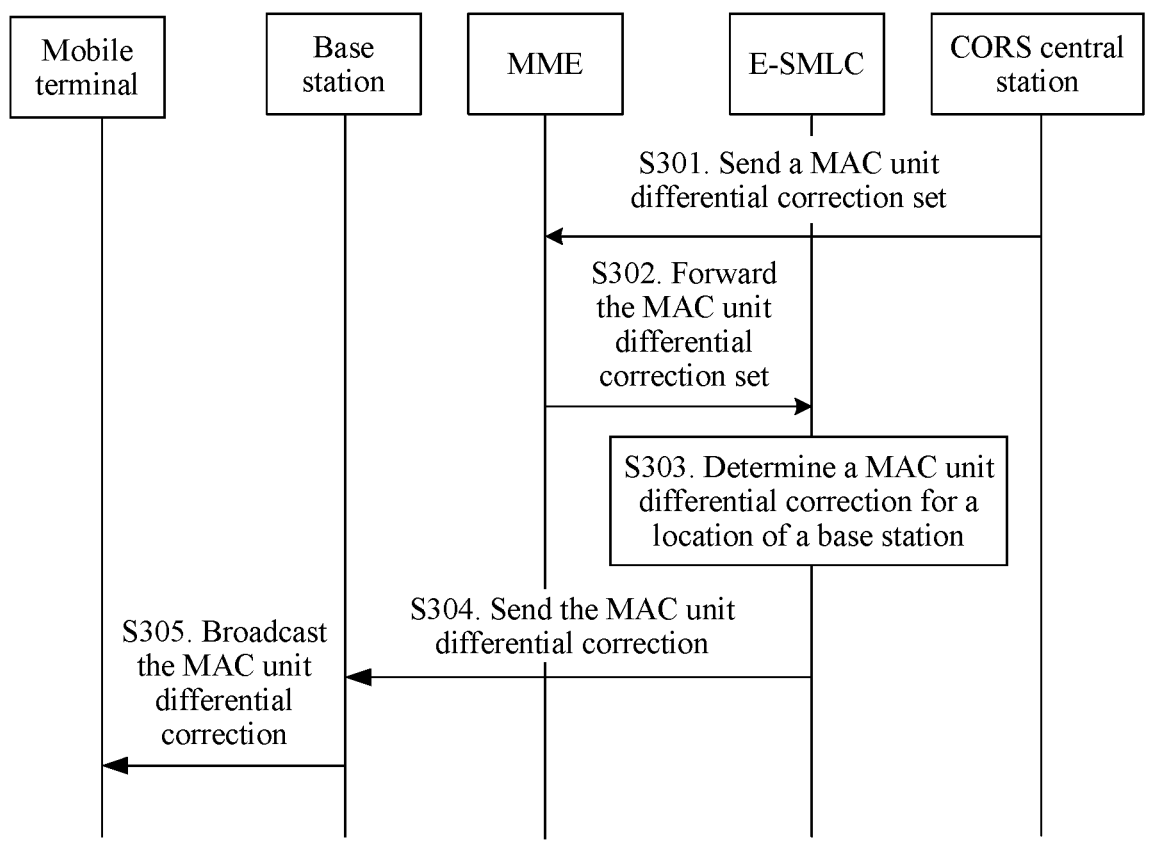
FIG. 3 is another schematic flowchart of a positioning method in a mobile network according to an embodiment of the present invention.

With reference to FIG. 3, a positioning method 300 in a mobile network is described in detail below by using an example in which an E-SMLC is used as a server to obtain a MAC unit differential correction.

As an example instead of a limitation, the E-SMLC may be a network element in a core network. As an important network element in the core network, a mobility management entity (MME) may be a gateway of the server. When high-precision positioning needs to be performed on a mobile terminal, a positioning request may first be sent to the MME to apply for positioning permission, and after being authenticated by the MME, the positioning request is forwarded to the server.

It should be understood that the MME used as the gateway of the server is merely described as an example, and shall not constitute any limitation on the present invention. The present invention is not limited thereto. When the server is in a base station or another network entity, the server may directly interact with a positioning service terminal, or another network element is used as the gateway of the server.

As shown in FIG. 3, the positioning method 300 includes the following operations.

Operation S301. A CORS central station sends MAC unit differential corrections of all MAC units in a CORS system to an MME, that is, a MAC unit differential correction set, where each MAC unit differential correction in the MAC unit differential correction set carries a unit attribute of a unit that the MAC unit differential correction is for, and the MAC unit differential correction may be carried in an Ntrip message.

Operation S302. The MME forwards the MAC unit differential correction set to the E-SMLC.

Operation S303. The E-SMLC calculates, according to the unit attribute carried in the MAC unit differential correction and a location of a base station, a MAC unit to which the base station belongs, to determine a MAC unit differential correction for the location of the base station.

Operation S304. The E-SMLC sends the MAC unit differential correction to the base station, where the MAC unit differential correction may be carried in an LPPa message.

Operation S305. After receiving the MAC unit differential correction, the base station broadcasts the MAC unit differential correction, so that a mobile terminal performs high-precision positioning according to the MAC unit differential correction, where the MAC unit differential correction may be sent, in a cell broadcast form (for example, a system information block (SIB) message), to a mobile terminal that is in a preset range of the base station.

It should be understood that the server (for example, the E-SMLC) may calculate, according to locations of multiple base stations, a MAC unit to which each base station belongs, to determine a MAC unit differential correction for each base station.

It should be noted that the server (for example, the E-SMLC) may continuously listen to correction information sent by the CORS system, and send the correction information to the base station in specific frequency (for example, once per second), to ensure real-time update of the correction information.

It should be further noted that the MAC unit differential correction is determined by the CORS central station according to an RTK observation value, and includes all observation values of a master reference station and differential corrections of an auxiliary reference station in the MAC unit. Therefore, after receiving the MAC unit differential correction, the mobile terminal may perform self-resolving on the MAC unit differential correction, to obtain correction information finally used for positioning.

Optionally, the correction information includes a MAC unit differential correction.

That the server obtains correction information for the base station according to the first location information, where the correction information is determined according to an RTK observation value obtained by a CORS system includes:

determining, by the server according to the first location information, a MAC unit to which the base station belongs in the CORS system;

determining, by the server, a target RTK observation value for the MAC unit from an RTK observation value set according to the MAC unit, where the RTK observation value set includes multiple RTK observation values sent by the CORS system to the server, and each of the multiple RTK observation values carries location information of a location that the RTK observation value is for; and determining, by the server, the MAC unit differential correction according to the target RTK observation value.

That the server sends the correction information to the base station, so that the base station forwards the correction information to a mobile terminal, and the mobile terminal corrects, according to the correction information, positioning information obtained from a positioning system by the mobile terminal, to determine a location of the mobile terminal includes:

sending, by the server, the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Specifically, alternatively, the server may not be connected to the central station in the CORS system, but is directly connected to a reference station in the CORS system and directly obtains an RTK observation value for each reference station (that is, an RTK observation value set) from the reference station. The server determines, according to the first location information or the location of the base station, the MAC unit to which the base station belongs, and then selects an RTK observation value (that is, the target RTK observation value) for the MAC unit according to the MAC unit and location information carried in each RTK observation value, and performs MAC resolving, to determine the correction information (that is, the MAC unit differential correction) for the base station.

In this embodiment of the present invention, if the CORS system does not support MAC resolving, the CORS system may have not performed MAC unit division on a coverage area. The server may perform MAC unit division on an entire network according to a location of the reference station in the CORS system, and then determine the MAC unit to which the base station belongs and the target RTK observation value according to the location of the base station.

It should be noted that a method for resolving, by the server, the RTK observation value sent by the CORS central station is not limited to a MAC technology, and may be a virtual reference station (VRS) method, a signal reference station method, a Flächen-Korrektur-Parameter (FKP) method, or the like. This is not particularly limited in the present invention. Any method in which a server receives an RTK observation value sent by a CORS central station and resolves the RTK observation value to obtain correction information falls within the protection scope of the present invention.

Figure 4:
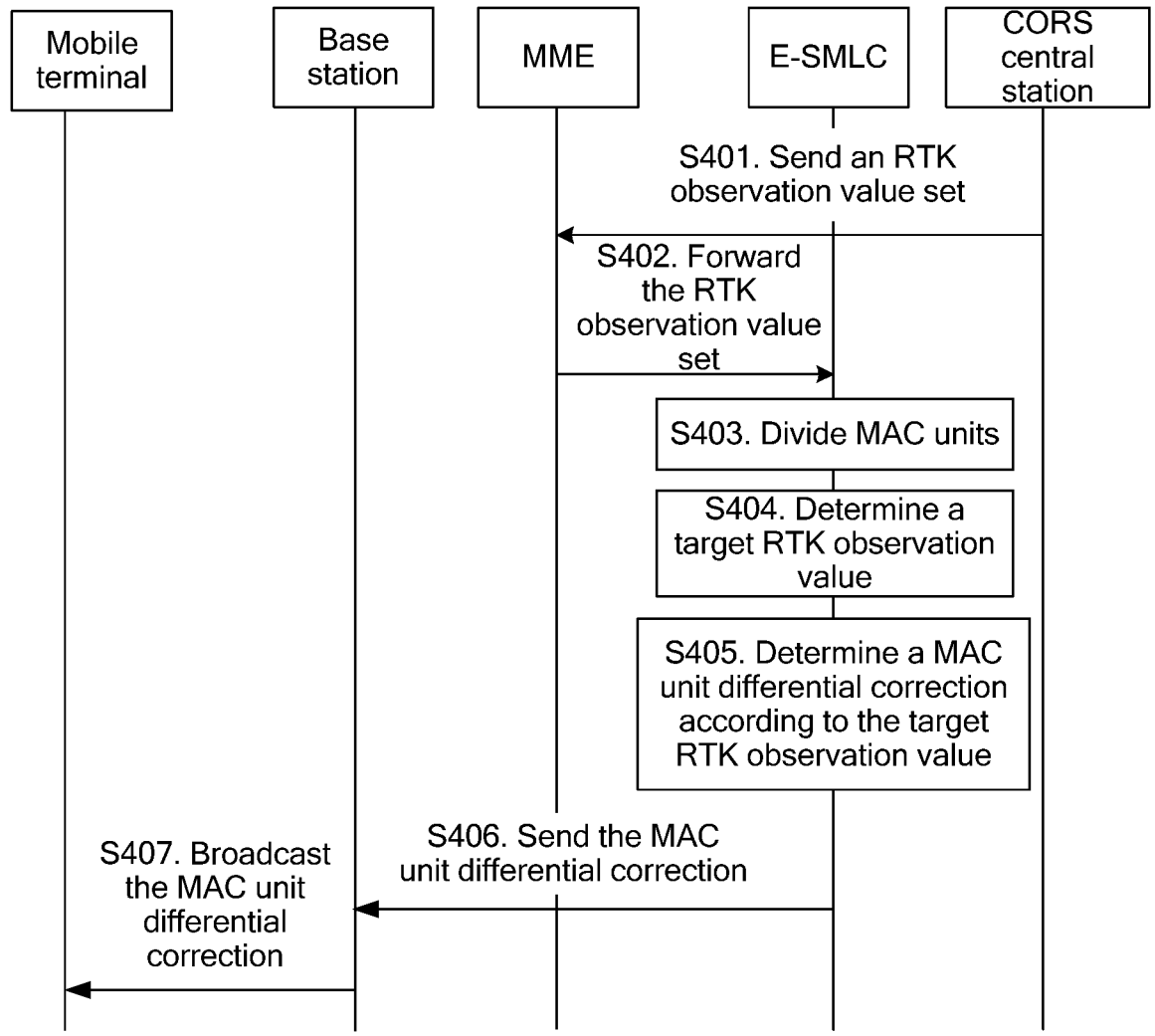
FIG. 4 is still another schematic flowchart of a positioning method in a mobile network according to an embodiment of the present invention.

With reference to FIG. 4, a positioning method 400 in a mobile network is described in detail below by using an example in which an E-SMLC is used as a server to obtain an RTK observation value, so as to determine a MAC unit differential correction.

As shown in FIG. 4, the positioning method 400 includes the following operations.

Operation S401. A CORS central station sends RTK observation values for all reference stations in a CORS system to an MME, that is, an RTK observation value set, where each RTK observation value in the RTK observation value set carries location information of a location (for example, a location of the reference station) that the RTK observation value is for, and the RTK observation value set may be carried in an Ntrip message.

Operation S402. The MME forwards the RTK observation value set to the E-SMLC.

Operation S403. Optionally, the E-SCML divides MAC units according to a location of the reference station in the CORS system.

Operation S404. The E-SMLC determines an RTK observation value for a location of a base station, that is, a target RTK observation value, according to the location of the base station and the location information carried in the RTK observation value.

Operation S405. The E-SMLC determines a MAC unit differential correction for the location of the base station according to the target RTK observation value.

Operation S406. The E-SMLC sends the MAC unit differential correction to the base station, where the MAC unit differential correction may be carried in an LPPa message.

Operation S407. After receiving the MAC unit differential correction, the base station broadcasts the MAC unit differential correction, so that a mobile terminal performs high-precision positioning according to the MAC unit differential correction, where the MAC unit differential correction may be sent, in a cell broadcast form, to a mobile terminal that is in a preset range of the base station.

It should be understood that the server (for example, the E-SMLC) may calculate, according to locations of multiple base stations, a MAC unit to which each base station belongs, to determine a MAC unit differential correction for each base station according to the RTK observation values.

It should be noted that the server (for example, the E-SMLC) may continuously listen to correction information sent by the CORS system, and send the correction information to the base station in specific frequency (for example, once per second), to ensure real-time update of the correction information.

Optionally, the base station includes M first base stations, and M is less than or equal to a preset threshold. The preset threshold is determined according to a processing capability of the CORS system. The M first base stations are all or some of base stations within a serving range of the server. The first location information includes location information of the first base station. The correction information includes a first virtual reference station VRS differential correction.

That the server obtains correction information for the base station according to the first location information, where the correction information is determined according to an RTK observation value obtained by a CORS system includes:
  sending, by the server, a request message to the CORS system, where the request message is used for requesting a first VRS differential correction for the first base station from the CORS system, and the request message carries the location information of the first base station; and
  receiving, by the server, the first VRS differential correction sent by the CORS system, where the first VRS differential correction is determined by the CORS system according to the location information of the first base station and the RTK observation value.

That the server sends the correction information to the base station, so that the base station forwards the correction information to a mobile terminal, and the mobile terminal corrects, according to the correction information, positioning information obtained from a positioning system by the mobile terminal, to determine a location of the mobile terminal includes:
  sending, by the server, the first VRS differential correction to the base station, so that the base station forwards the first VRS differential correction to the mobile terminal, and the mobile terminal corrects, according to the first VRS differential correction, the positioning information obtained from the positioning system by the mobile terminal, to determine the location of the mobile terminal.

Optionally, the base station includes the M first base stations and a second base station. Locations of the M first base stations are determined according to locations of the base stations within the serving range of the server.

Specifically, when the CORS system supports VRS resolving, the server may request a VRS differential correction of the base station from the CORS central station. The CORS central station performs VRS resolving according to the first location information or the location of the base station, to determine the VRS differential correction for the base station.

In this embodiment of the present invention, because there are a relatively large quantity of base stations in an entire network, the request message may be sent to the CORS system for some base stations (for example, M base stations, where M is less than or equal to the preset threshold in the CORS system), or a VRS request is sent to the CORS central station for the first base station.

It should be noted that the preset threshold in the CORS system is determined according to the processing capability of the CORS system. When the CORS system has a relatively small capability, the CORS system cannot receive VRS requests for a relatively large quantity of base stations. During resolving, the preset threshold is relatively low, M is relatively small, and the first base stations are relatively sparsely distributed in the network. On the contrary, when the CORS system has a relatively large capability, the CORS system may receive VRS requests for a relatively large quantity of base stations at the same time, the preset threshold is relatively high, M is relatively large, and the first base stations are relatively densely distributed in the network. When the capacity of the CORS system is large enough to receive VRS requests for all base stations connected to the server, all the base stations may be determined as first base stations, that is, all the base stations may directly request VRS differential corrections from the CORS system by using the server, that is, first VRS differential corrections. The first VRS differential correction is determined by the CORS system by obtaining an RTK observation value of a neighboring reference station according to the first location information (that is, the location information of the first base station) and performing VRS resolving.

Figure 5:
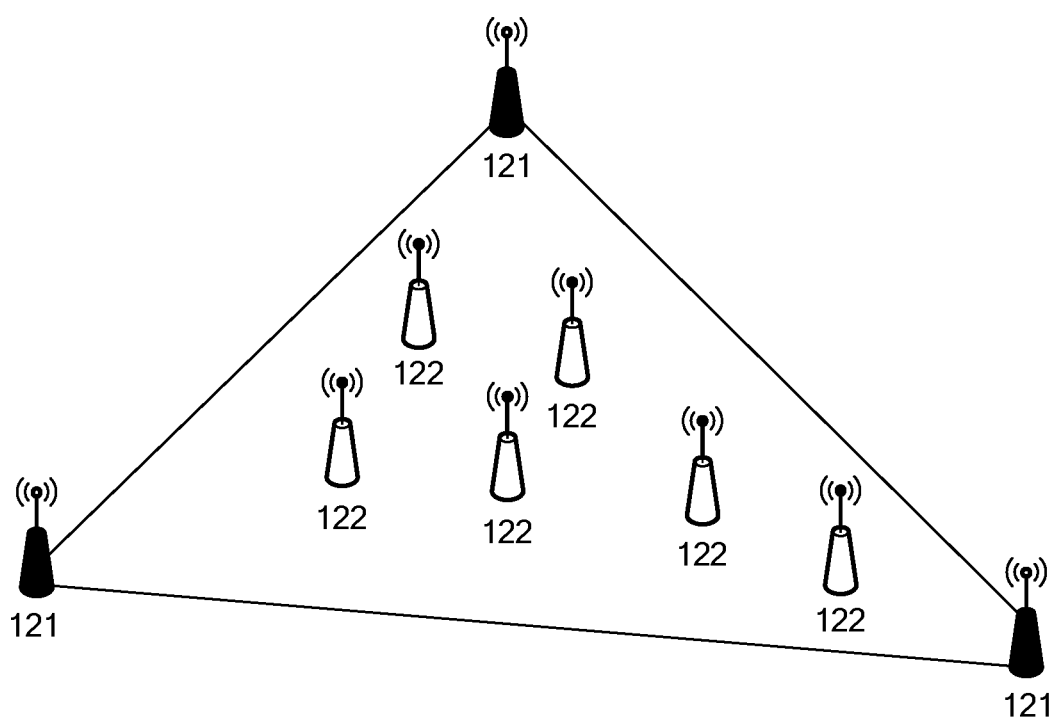
FIG. 5 is a schematic diagram of base station distribution applicable to a positioning method in a mobile network according to an embodiment of the present invention.

FIG. 5 is a schematic diagram of distribution of first base stations according to an embodiment of the present invention. As shown in FIG. 5, solid base stations are first base stations 121. In an entire network, base stations in a range formed by the first base stations are second base stations 122. The first base stations 121 may be evenly distributed among the second base stations 122. A VRS differential correction, determined by the CORS system according to a location of the first base station, for the first base station is the first VRS differential correction.

Figure 6:
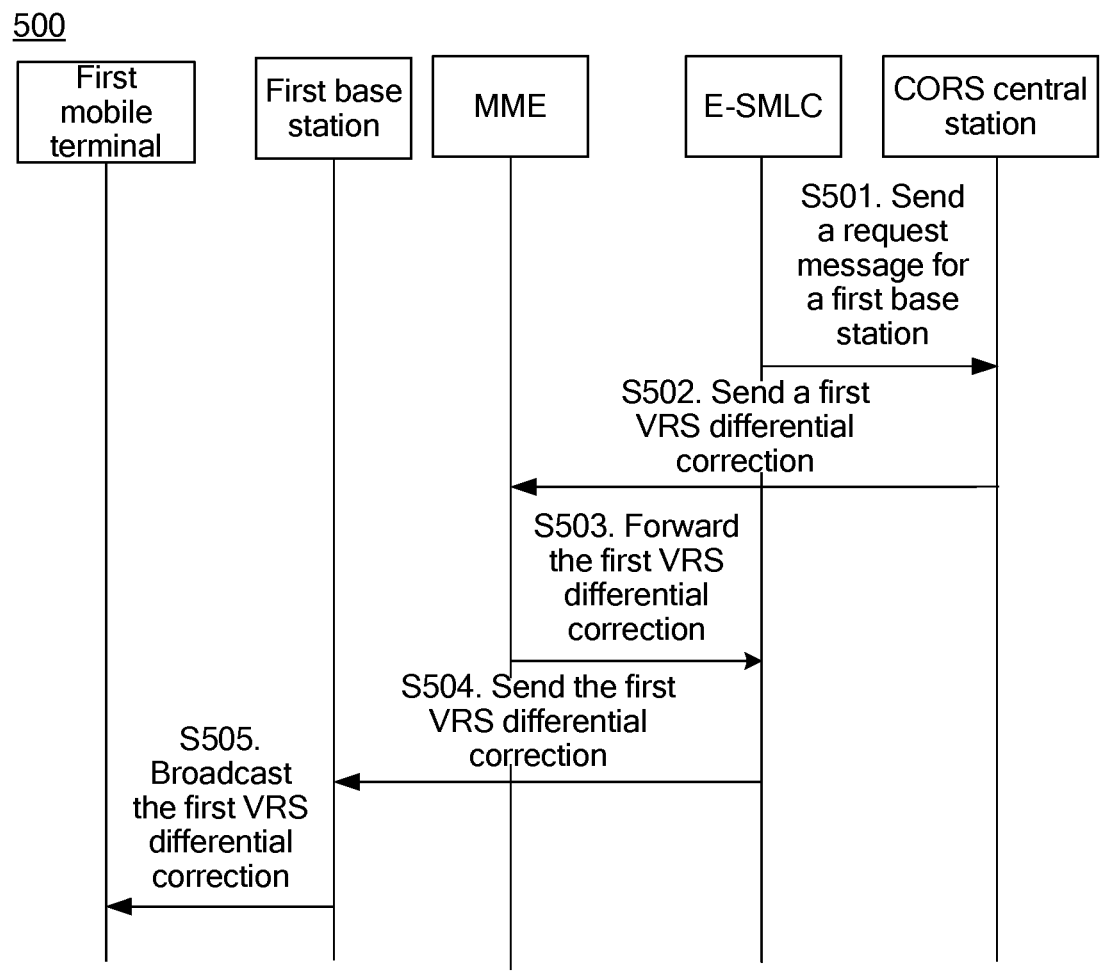
FIG. 6 is yet another schematic flowchart of a positioning method in a mobile network according to an embodiment of the present invention.

With reference to FIG. 6, a positioning method 500 in a mobile network is described in detail below by using an example in which an E-SMLC is used as a server to obtain a first VRS differential correction.

As shown in FIG. 6, the positioning method 500 includes the following operations.

Operation S501. The E-SMLC sends a request message to a CORS central station in a CORS system, where the request message carries location information (that is, an example of first location information) of a first base station, to request the CORS system to perform VRS resolving for the first base station, and determine a first VRS differential correction. The request message may be carried in an Ntrip message.

Operation S502. The CORS system sends the first VRS differential correction to an MME.

Operation S503. The MME forwards the first VRS differential correction to the E-SMLC.

Operation S504. The E-SMLC sends the first VRS differential correction to the first base station, where the first VRS differential correction may be carried in an LPPa message.

Operation S505. The first base station broadcasts the first VRS differential correction, where the first VRS differential correction may be sent, in a cell broadcast form, to a mobile terminal that is in a preset range of the first base station.

It should be noted that alternatively, the server may request the CORS system to perform VRS resolving for all base stations, and the CORS system may perform VRS resolving on all the base stations according to the request message sent by the server, to determine a VRS differential correction for each base station. This is not particularly limited in the present invention.

It should be further noted that the server (for example, the E-SMLC) may continuously listen to correction information sent by the CORS system, and send the correction information to a second base station in specific frequency (for example, once per second), to ensure real-time update of the correction information.

Therefore, in this embodiment of the present invention, correction information is determined for the first base station by requesting the CORS system, and correction information of the second base station is determined according to the correction information for the first base station, so that working pressure of the CORS system is reduced.

Optionally, the correction information further includes a second VRS differential correction. The first location information further includes location information of the second base station.

That the server obtains correction information for the base station according to the first location information, where the correction information is determined according to an RTK observation value obtained by a CORS system includes:

determining, by the server according to the location information of the second base station, at least three target first base stations that are the closest to the second base station; and determining, by the server, the second VRS differential correction according to at least three first VRS differential corrections for the at least three target first base stations, where each of the at least three target first base stations is in one-to-one correspondence with each of the at least three first VRS differential corrections.

That the server sends the correction information to the base station, so that the base station forwards the correction information to a mobile terminal, and the mobile terminal corrects, according to the correction information, positioning information obtained from a positioning system by the mobile terminal, to determine a location of the mobile terminal further includes:

sending, by the server, the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the mobile terminal.

In this embodiment of the present invention, in a coverage area of one CORS system, if all base stations request VRS differential corrections from the CORS system, calculation pressure of the CORS system is greatly increased. Therefore, the server may classify the base stations into a first base station and a second base station according to locations of the base stations and distances between the base stations. The second base station is a base station near the first base station.

Specifically, the server may select at least three target first base stations for the second base station according to location information (that is, another example of the first location information) of the second base station, and perform secondary resolving on at least three first VRS differential corrections for the at least three target first base stations, to determine the second VRS differential correction for the second base station. That is, each target first base station is corresponding to one VRS differential correction. The server may perform secondary resolving according to the at least three first VRS differential corrections, to obtain the second VRS differential correction. As shown in FIG. 5, within a triangle formed by the first base stations 121, all second base stations 122 can obtain the second VRS differential correction by using the foregoing method.

It should be understood that distribution of the first base stations and the second base stations shown in FIG. 5 is merely described as an example, and shall not constitute any limitation on the present invention. The server may perform secondary resolving according to first VRS differential corrections for more target first base stations, to determine the second VRS differential correction for the second base station.

It should be noted that when the first base stations are distributed relatively densely, a distance between the first base station and the second base station is relatively short, and a second VRS differential correction obtained by performing secondary resolving according to a first VRS differential correction of the first base station has relatively high precision. Therefore, within a capability range of the CORS system, as more base stations as possible may be selected as first base stations, to ensure high-precision of the second VRS differential correction.

Optionally, the M first base stations are M virtual base stations (or virtual points). That is, some geographic location points are selected as virtual points according to distribution of all base stations connected to the server. The virtual points are evenly distributed in terms of geographic locations. In other words, the virtual points are virtual points evenly distributed in the base station according to a location of the base station.

Figure 7:
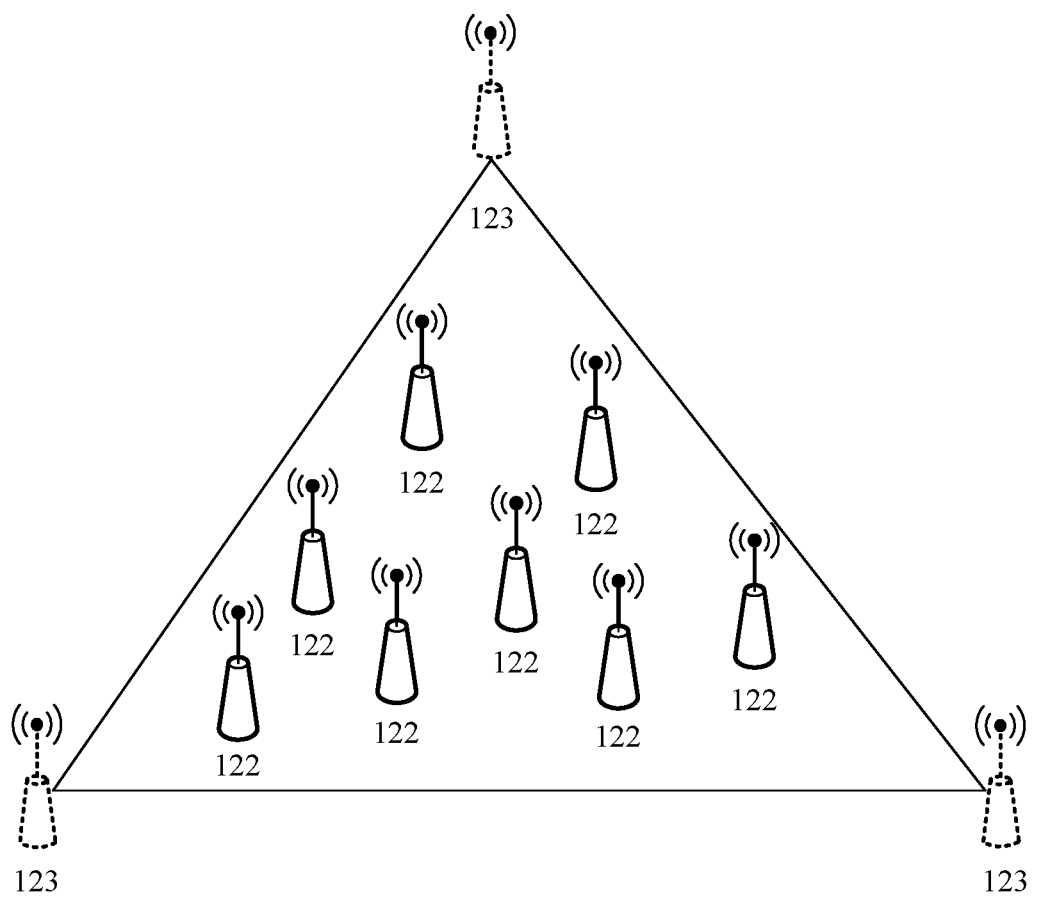
FIG. 7 is a schematic diagram of virtual base station distribution applicable to a positioning method in a mobile network according to an embodiment of the present invention.

FIG. 7 is a schematic diagram of virtual point distribution applicable to a positioning method in a mobile network according to an embodiment of the present invention. As shown in FIG. 7, three virtual base stations 1, 2, and 3 may form an equilateral triangle. The three virtual base stations 1, 2, and 3 are three vertexes of the equilateral triangle. Multiple second base stations 122 are distributed in the equilateral triangle. When secondary resolving needs to be performed for any second base station 122 in the equilateral triangle, a server may select, to send a VRS request to a CORS system, the virtual base stations 1, 2, and 3 on the three vertexes of the equilateral triangle that surrounds the second base stations 122, to obtain three first VRS differential corrections for the three virtual base stations. The server performs secondary resolving according to the three first VRS differential corrections, to determine a second VRS differential correction. It should be understood that the virtual base station is merely described as an example. The virtual base station is not a base station, but when a base station is established at the virtual point, the virtual base station may be an actual base station. This is not particularly limited in the present invention.

It should be noted that in secondary resolving performed by using a VRS method, secondary resolving may be performed according to at least three VRS differential corrections, or secondary resolving may be performed according to three single reference station differential corrections or MAC unit differential corrections. A VRS resolving method is not particularly limited in the present invention.

Figure 8:
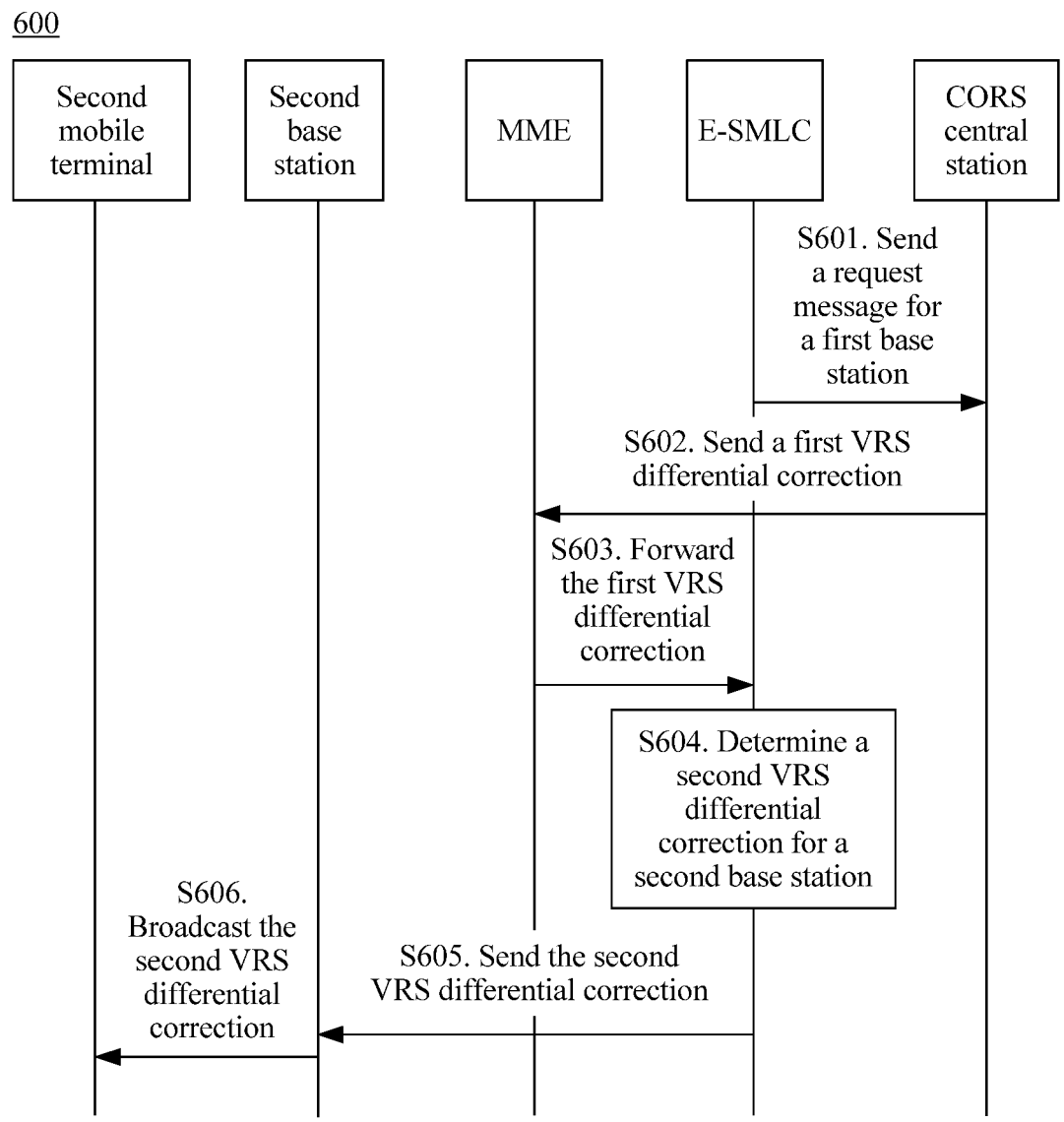
FIG. 8 is yet another schematic flowchart of a positioning method in a mobile network according to an embodiment of the present invention.

With reference to FIG. 8, a positioning method 600 in a mobile network is described in detail below by using an example in which an E-SMLC is used as a server to obtain a second VRS differential correction.

As shown in FIG. 8, the positioning method 600 includes the following operations.

Operation S601. The E-SMLC sends a request message to a CORS central station in a CORS system, where the request message carries location information of at least three first base stations, to request the CORS system to perform VRS resolving for the at least three first base stations, and determine at least three first VRS differential corrections. The request message may be carried in an Ntrip message. There may be one request message, that is, VRS requests for the at least three first base stations are carried in one Ntrip message. Alternatively, there may be multiple request messages, that is, each request message is corresponding to one VRS request for the first base station, and each request message is carried in one Ntrip message.

Operation S602. The CORS system sends the at least three first VRS differential corrections to an MME.

Operation S603. The MME forwards the at least three first VRS differential corrections to the E-SMLC.

Operation S604. The E-SMLC performs secondary resolving on the at least three first VRS differential corrections according to location information of a second base station, to determine a second VRS differential correction for the second base station.

Operation S605. The E-SMLC sends the second VRS differential correction to the second base station, where the second VRS differential correction may be carried in an LPPa message.

Operation S606. The second base station broadcasts the second VRS differential correction, where the second VRS differential correction may be sent, in a cell broadcast form, to a mobile terminal that is in a preset range of the second base station.

It should be noted that the server (for example, the E-SMLC) may calculate a second VRS differential correction for each second base station according to locations of multiple second base stations.

It should be further noted that the server (for example, the E-SMLC) may continuously listen to correction information sent by the CORS system, and send the correction information to the second base station in specific frequency (for example, once per second), to ensure real-time update of the correction information.

It should be further noted that both the first VRS differential correction and the second VRS differential correction are in a same format (for example, RTCM 2. X). A difference lies only in that the second VRS differential correction is determined by performing secondary resolving on at least three first VRS differential corrections. It should be understood that RTCM 2.X is merely described as an example, and a format of the VRS differential correction further includes RTCM 3.0, a compact measurement record (CMR) format, CMR+, or the like. This is not particularly limited in the present invention.

Optionally, the correction information includes a VRS differential correction.

That the server obtains correction information for the base station according to the first location information, where the correction information is determined according to an RTK observation value obtained by a CORS system includes:

determining, by the server, at least three target RTK observation values for the base station from an RTK observation value set according to the first location information, where the RTK observation value set includes multiple RTK observation values sent by the CORS system to the server, and each of the multiple RTK observation values carries location information of a location that the RTK observation value is for; and determining, by the server, the VRS differential correction according to the at least three target RTK observation values.

That the server sends the correction information to the base station, so that the base station forwards the correction information to a mobile terminal, and the mobile terminal corrects, according to the correction information, positioning information obtained from a positioning system by the mobile terminal, to determine a location of the mobile terminal includes:

sending, by the server, the VRS differential correction to the base station, so that the base station forwards the VRS differential correction to the mobile terminal, and the mobile terminal corrects, according to the VRS differential correction, the positioning information obtained from the positioning system by the mobile terminal, to determine the location of the mobile terminal.

Specifically, alternatively, the server may receive all RTK observation values (that is, the RTK observation value set) sent by the CORS central station, and select, according to the location of the base station, at least three RTK observation values (that is, the target RTK observation values) for the location of the base station and perform VRS resolving, to determine the VRS differential correction for the base station.

Figure 9:
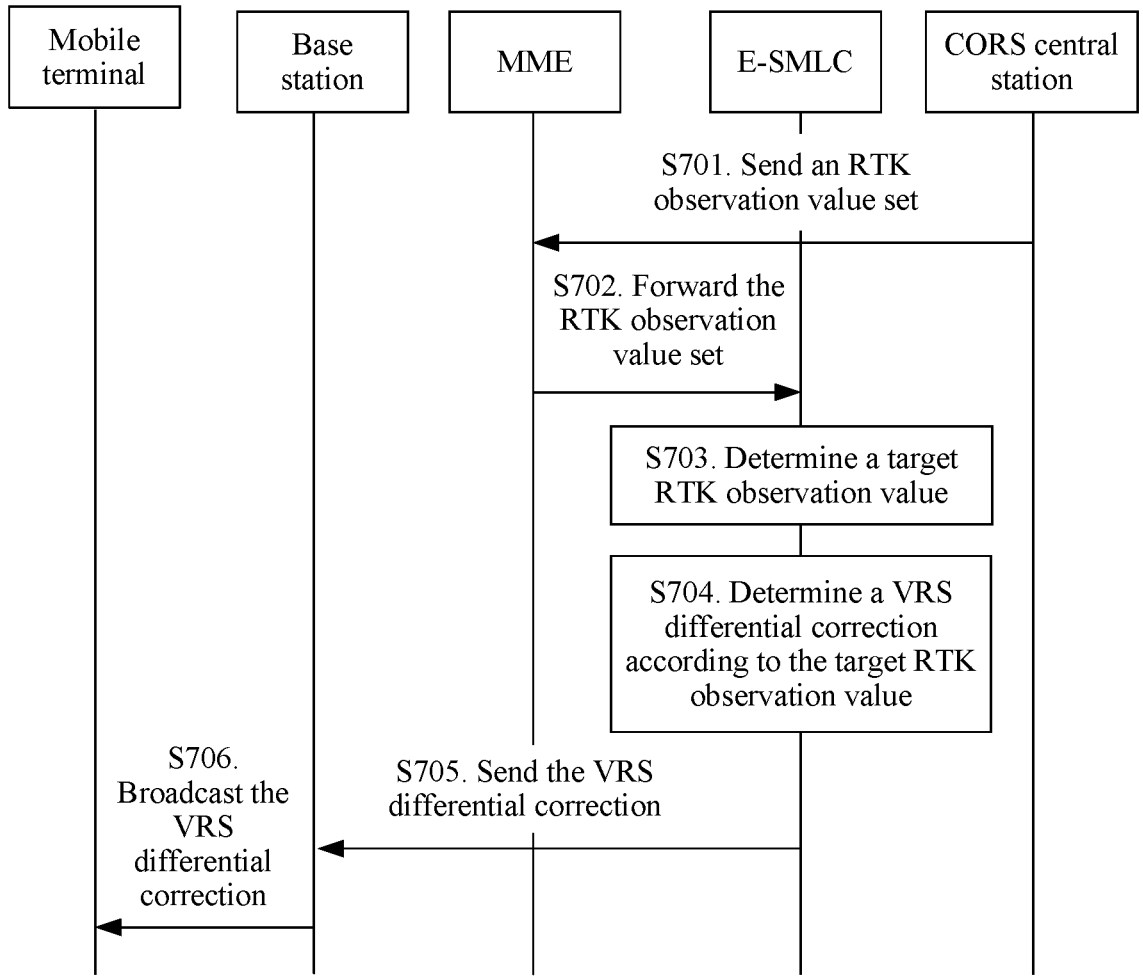
FIG. 9 is a yet another schematic flowchart of a positioning method in a mobile network according to an embodiment of the present invention.

With reference to FIG. 9, a positioning method 700 in a mobile network is described in detail below by using an example in which an E-SMLC is used as a server to obtain a VRS differential correction.

As shown in FIG. 9, the positioning method 700 includes the following operations.

Operation S701. A CORS central station sends, to an MME, all RTK observation values obtained by a CORS system, that is, an RTK observation value set, where each RTK observation value in the RTK observation value set carries location information of a location that the RTK observation value is for, and the RTK observation value set may be carried in an Ntrip message.

Operation S702. The MME forwards the RTK observation value set to the E-SMLC.

Operation S703. The E-SMLC determines an RTK observation value for a location of a base station, that is, a target RTK observation value, according to the location of the base station and the location information carried in the RTK observation value.

Operation S704. The E-SMLC determines a VRS differential correction for the location of the base station according to the target RTK observation value.

Operation S705. The E-SMLC sends the VRS differential correction to the base station, where the VRS differential correction may be carried in an LPPa message.

Operation S706. After receiving the VRS differential correction, the base station broadcasts the VRS differential correction, so that a mobile terminal performs high-precision positioning according to the VRS differential correction.

It should be noted that the server (for example, the E-SMLC) may calculate a VRS differential correction for each base station according to locations of multiple base stations.

It should be further noted that the server (for example, the E-SMLC) may continuously listen to correction information sent by the CORS system, and send the correction information to the base station in specific frequency (for example, once per second), to ensure real-time update of the correction information.

It should be further noted that after receiving the correction information, the mobile terminal may perform corresponding processing according to a type of the correction information. For example, the mobile terminal may determine the type of the correction information according to indication information carried in a message header of a message that carries the correction information, to perform corresponding calculation and processing. For example, if the correction information is a VRS differential correction, the mobile terminal may directly correct positioning information from the GNSS by using the VRS differential correction. If the correction information is a MAC unit differential correction, and the MAC unit differential correction includes all observation values of a master station and differential corrections of an auxiliary station, the mobile terminal may perform self-resolving on the MAC unit differential correction, to obtain a differential correction used for positioning. It should be understood that a method for calculating and processing the correction information by the mobile terminal is similar to a processing method of a mobile station in the prior art. This is not particularly limited in the present invention.

Optionally, the method 700 further includes:
sending, by the server, a first positioning certificate to the base station; and
sending, by the server, a second positioning certificate to the mobile terminal, where the second positioning certificate is corresponding to the first positioning certificate, so that the mobile terminal obtains the correction information from the base station according to the second positioning certificate.

In this embodiment of the present invention, when the server (for example, the E-SMLC) is disposed in a core network, or a network element in a core network is used as the server, as an important network element in the core network, the MME may be a gateway of the server. When a positioning service terminal needs to perform high-precision positioning on the mobile terminal, the positioning service terminal may first send a positioning request to the MME to request positioning permission. After being authenticated by the MME, the positioning request is forwarded to the server.

In this embodiment of the present invention, after receiving a request for positioning the mobile terminal, the E-SMLC (that is, an example of the server) may first request a positioning capability from the mobile terminal, to determine whether the mobile terminal normally receives a GNSS signal, whether the mobile terminal supports a GNSS carrier phase observation technology, whether the mobile terminal has high-precision positioning permission, and whether the mobile terminal enables a function such as positioning/location reporting. When the mobile terminal meets the foregoing conditions, the E-SMLC delivers the second positioning certificate to the mobile terminal, so that the mobile terminal obtains, according to the second positioning certificate, the correction information sent by the base station.

Figure 10:
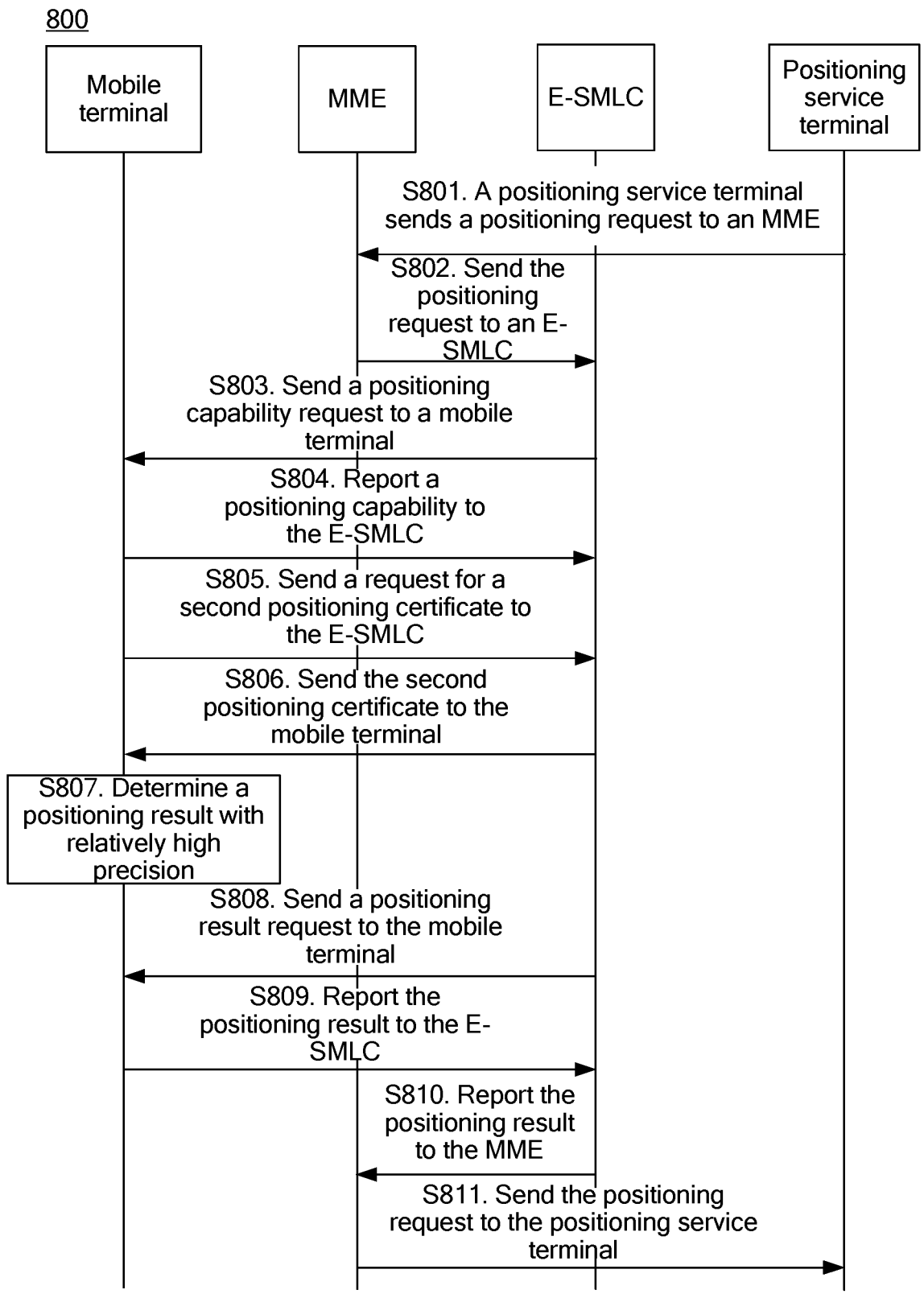
FIG. 10 is a yet another schematic flowchart of a positioning method in a mobile network according to an embodiment of the present invention.

With reference to FIG. 10, a positioning method 800 in a mobile network is described in detail below by using an example in which an E-SMLC is used as a server and a positioning service terminal requests the E-SMLC to position a mobile terminal.

As shown in FIG. 10, the positioning method 800 includes the following operations.

Operation S801. The positioning service terminal sends a positioning request to an MME, to request to perform high-precision positioning on a mobile terminal.

Operation S802. The MME authenticates the positioning request, and after the positioning request is authenticated by the MME, the MME forwards the positioning request to the E-SMLC for processing.

Operation S803. The E-SMLC sends, according to the positioning request, a positioning capability request to the mobile terminal that requests to be positioned, and operation S804 is performed if the mobile terminal meets the following conditions: (a) A GNSS signal is normal; (b) GNSS carrier phase observation is supported; (c) A subscriber identity module (SIM) card has high-precision positioning permission; and (d) A positioning/location reporting function is enabled.

Operation S804. The mobile terminal reports a positioning capability to the E-SMLC, and notifies the E-SMLC that the mobile terminal meets the positioning conditions.

Operation S805. The mobile terminal sends a request for a second positioning certificate to the E-SMLC.

Operation S806. The E-SMLC sends the second positioning certificate to the mobile terminal according to the positioning capability reported by the mobile terminal, so that the positioning service terminal can perform high-precision positioning on the mobile terminal.

Operation S807. The mobile terminal corrects GNSS positioning information according to correction information from the base station, to determine a positioning result with relatively high precision. A specific process of obtaining the correction information and forwarding the correction information to the mobile terminal by the base station has been described in detail in the foregoing methods. For brevity, details are not described herein.

Operation S808. The E-SMLC sends a positioning result request to the mobile terminal.

Operation S809. After receiving the positioning result request, the mobile terminal reports the positioning result to the E-SMLC.

Operation S810. After receiving the positioning result, the E-SMLC reports the positioning result to the MME.

Operation S811. The MME sends the positioning result to the positioning service terminal, so that the request of the positioning service terminal for performing high-precision positioning on the mobile terminal is completed.

Particularly, if the mobile terminal has not enabled the positioning/location reporting function, the E-SMLC may trigger, according to the positioning request of the positioning service terminal, the mobile terminal to download the second positioning certificate, so as to enable the positioning/location reporting function.

It should be understood that sequence numbers of the foregoing processes do not mean execution sequences. The execution sequences of the processes should be determined according to functions and internal logic of the processes, and should not constitute any limitation on an implementation process of this embodiment of the present invention. For example, in this embodiment of the present invention, operations S805 and S806 may be performed before operation S801, or may be performed at any time between operation S801 and operation S804.

It should be noted that in operations S803, S804, S805, S806, S807, S808, and S809 in the foregoing method, information interacted between the mobile terminal and the E-SMLC may be carried by using an LPP message. LPP is a protocol, in LTE, used for communication between user equipment and a positioning service center.

It should be further noted that the foregoing MME, E-SMLC, and positioning service terminal are merely described as examples, and shall not constitute any limitation on the present invention. The present invention is not limited thereto.

According to the positioning method in this embodiment of the present invention, a server is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 11:
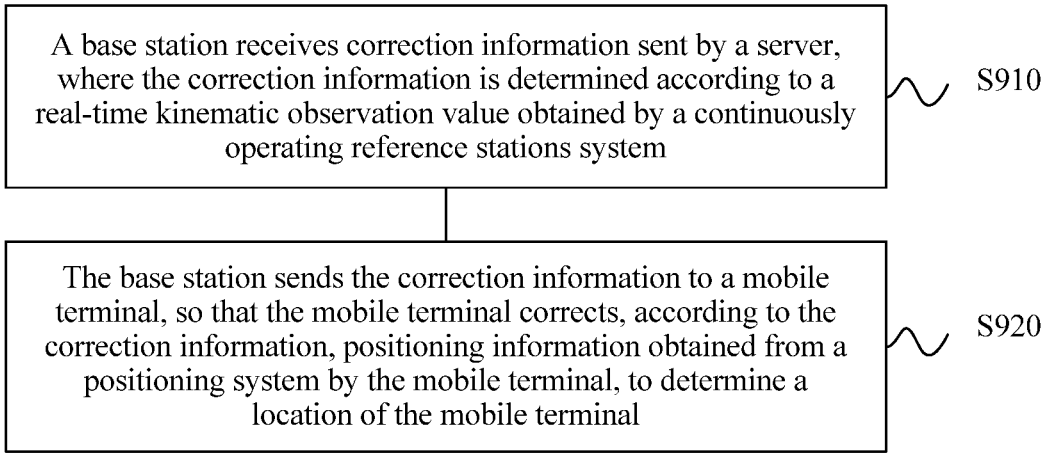
FIG. 11 is a schematic flowchart of a positioning method in a mobile network according to another embodiment of the present invention.

With reference to FIG. 2 to FIG. 10, the positioning method in a mobile network according to the embodiments of the present invention is described in detail above from a perspective of a server. With reference to FIG. 11, the positioning method in a mobile network according to the embodiments of the present invention is described in detail below from a perspective of a base station.

FIG. 11 is a schematic flowchart of a positioning method 900 in a mobile network according to an embodiment of the present invention that is described from a perspective of a base station. As shown in FIG. 11, the positioning method 900 includes the following operations.

Operation S910. The base station receives correction information sent by a server, where the correction information is determined according to a real-time kinematic observation value obtained by a continuously operating reference stations system.

Operation S920. The base station sends the correction information to a mobile terminal, so that the mobile terminal corrects, according to the correction information, positioning information obtained from a positioning system by the mobile terminal.

In this embodiment of the present invention, as an example instead of a limitation, the CORS system may be the CORS system 20 in FIG. 1, the server may be the server 110 in FIG. 1, the base station may be the base station 120 in FIG. 1, and the mobile terminal may be the mobile terminal 130 in FIG. 1.

Optionally, that the base station sends the correction information to a mobile terminal, so that the mobile terminal corrects, according to the correction information, positioning information obtained from a positioning system by the mobile terminal, to determine a location of the mobile terminal includes:

sending, by the base station, a cell broadcast message, where the cell broadcast message carries the correction information, so that the mobile terminal corrects, according to the correction information, the positioning information obtained from the positioning system by the mobile terminal, to determine the location of the mobile terminal.

Optionally, the cell broadcast message includes a SIB message.

In this embodiment of the present invention, actions of the base station are similar to actions of the mobile terminals in the methods in FIG. 2 to FIG. 10. To avoid repetition, detailed descriptions thereof are omitted.

According to the positioning method in this embodiment of the present invention, a server is connected to a CORS system, to obtain correction information; and the correction information is forwarded to a mobile terminal, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 12:
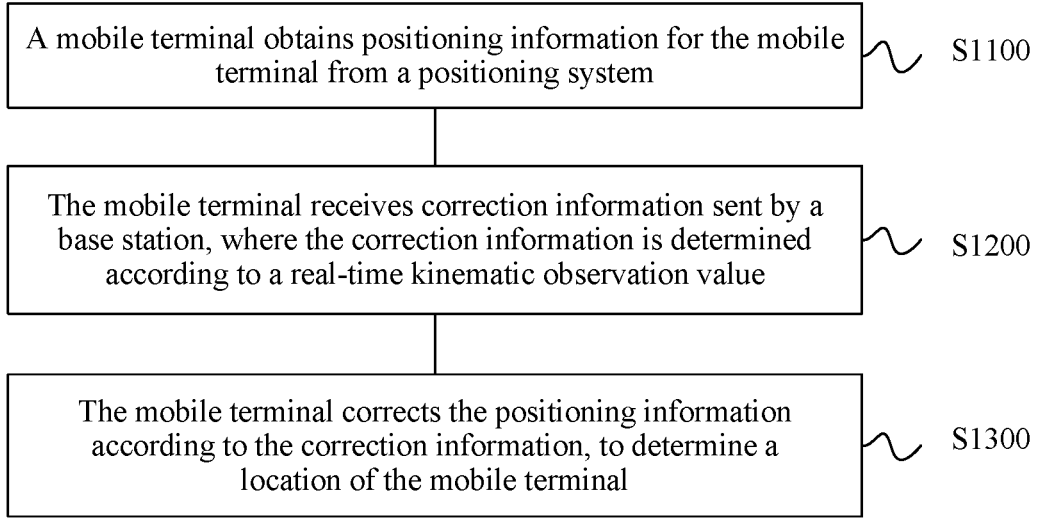
FIG. 12 is a schematic flowchart of a positioning method in a mobile network according to still another embodiment of the present invention.

With reference to FIG. 11, the positioning method in a mobile network according to the embodiments of the present invention is described in detail above from a perspective of a base station. With reference to FIG. 12, the positioning method in a mobile network according to the embodiments of the present invention is described in detail below from a perspective of a mobile terminal.

FIG. 12 is a positioning method 1000 in a mobile network according to an embodiment of the present invention that is described from a perspective of a mobile terminal. As shown in FIG. 12, the positioning method 1000 includes the following operations.

Operation S1100. The mobile terminal obtains positioning information for the mobile terminal from a positioning system.

Operation S1200. The mobile terminal receives correction information sent by a base station, where the correction information is determined according to a real-time kinematic observation value.

Operation S1300. The mobile terminal corrects the positioning information according to the correction information, to determine a location of the mobile terminal.

In the method 1000, actions of the mobile terminal are similar to actions of the mobile terminals in the methods in FIG. 2 to FIG. 11. To avoid repetition herein, detailed descriptions thereof are omitted.

According to the positioning method in a mobile network in this embodiment of the present invention, a mobile terminal receives correction information from a base station, and corrects positioning information obtained from a positioning system by the mobile terminal, to determine high-precision positioning information of the mobile terminal. Therefore, a requirement of massive mobile users for high-precision positioning is met.

With reference to FIG. 1 to FIG. 12, the positioning method in a mobile network according to the embodiments of the present invention is described in detail above. With reference to FIG. 13 to FIG. 18, a server, a base station, a mobile terminal, and a system according to the embodiments of the present invention are described in detail below.

Figure 13:
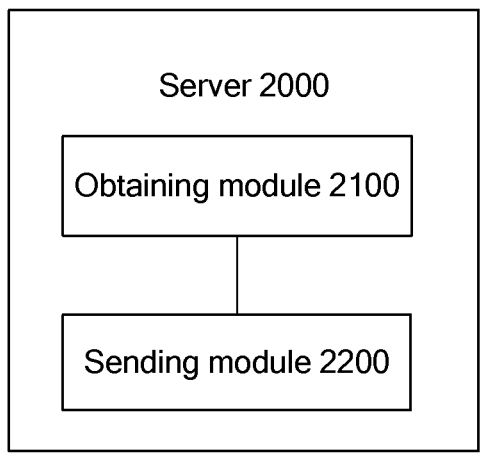
FIG. 13 is a schematic block diagram of a server according to an embodiment of the present invention.

FIG. 13 shows a server 2000 according to an embodiment of the present invention. As shown in FIG. 13, the server 2000 includes an obtaining module 2100 and a sending module 2200.

The obtaining module 2100 is configured to: obtain first location information, where the first location information is used to indicate a location of a base station, and obtain correction information for the base station according to the location of the base station, where the correction information is determined according to a real-time kinematic RTK observation value obtained by a continuously operating reference stations CORS system.

The sending module 2200 is configured to send the correction information to the base station, so that the base station forwards the correction information to a mobile terminal, and the mobile terminal corrects, according to the correction information, positioning information obtained from a positioning system by the mobile terminal, to determine a location of the mobile terminal.

Optionally, the correction information includes a Master-Auxiliary Concept MAC unit differential correction. The obtaining module 2100 includes a determining unit and a receiving unit.

The determining unit is configured to determine, according to the first location information, a MAC unit to which the base station belongs in the CORS system.

The receiving unit is configured to receive a MAC unit differential correction set sent by the CORS system, where the MAC unit differential correction set includes multiple MAC unit differential corrections, and each of the multiple MAC unit differential corrections carries location information of a unit that the MAC unit differential correction is for.

The determining unit is further configured to determine a MAC unit differential correction for the MAC unit from the MAC unit differential correction set according to the MAC unit.

The sending module 2200 is specifically configured to send the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Optionally, the correction information includes a MAC unit differential correction. The obtaining module 2100 includes a determining unit and a receiving unit.

The determining unit is configured to determine, according to the first location information, a MAC unit to which the base station belongs in the CORS system.

The receiving unit is configured to receive an RTK observation value set sent by the CORS system. The RTK observation value set includes multiple RTK observation values, and each of the multiple RTK observation values carries location information of a location that the RTK observation value is for.

The determining unit is further configured to determine the MAC unit differential correction according to a target RTK observation value.

The sending module 2200 is specifically configured to send the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Optionally, the correction information includes a first virtual reference station VRS differential correction. The first location information includes location information of a first base station.

The sending module 2200 is further configured to send a request message to the CORS system. The request message is used for requesting a first VRS differential correction for the first base station from the CORS system, and the request message carries the location information of the first base station.

The obtaining module 2100 further includes a receiving unit, configured to receive the first VRS differential correction sent by the CORS system. The first VRS differential correction is determined by the CORS system according to the location information of the first base station and the RTK observation value.

The sending module 2200 is specifically configured to send the first VRS differential correction to the first base station, so that the base station forwards the first VRS differential correction to the mobile terminal, and the mobile terminal corrects, according to the first VRS differential correction, the positioning information obtained from the positioning system by the mobile terminal, to determine the location of the mobile terminal.

Optionally, the correction information further includes a second VRS differential correction. The first location information further includes location information of a second base station.

The obtaining module 2100 further includes a determining unit, configured to: determine, according to a location of the second base station, at least three target first base stations that are the closest to the second base station; and determine the second VRS differential correction according to at least three first VRS differential corrections for the at least three target first base stations, where each of the at least three target first base stations is in one-to-one correspondence with each of the at least three first VRS differential corrections.

The sending module 2200 is specifically configured to send the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the mobile terminal.

Optionally, the correction information includes a VRS differential correction. The obtaining module 2100 includes a receiving unit and a determining unit.

The receiving unit is configured to receive an RTK observation value set sent by the CORS system. The RTK observation value set includes multiple RTK observation values, and each of the multiple RTK observation values carries location information of a location that the RTK observation value is for.

The determining unit is configured to: determine at least three target RTK observation values for the base station from the RTK observation value set according to the first location information, and determine the VRS differential correction according to the at least three target RTK observation values.

The sending module 2200 is specifically configured to send the VRS differential correction to the base station, so that the base station forwards the VRS differential correction to the mobile terminal, and the mobile terminal corrects, according to the VRS differential correction, the positioning information obtained from the positioning system by the mobile terminal, to determine the location of the mobile terminal.

The server 2000 according to this embodiment of the present invention may be corresponding to servers in the positioning methods in a mobile network in the embodiments of the present invention. In addition, the modules in the server 2000 and the foregoing other operations and/or functions are separately intended to implement corresponding procedures of the methods in FIG. 2 to FIG. 12. For brevity, details are not described herein.

The server in this embodiment of the present invention is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 14:
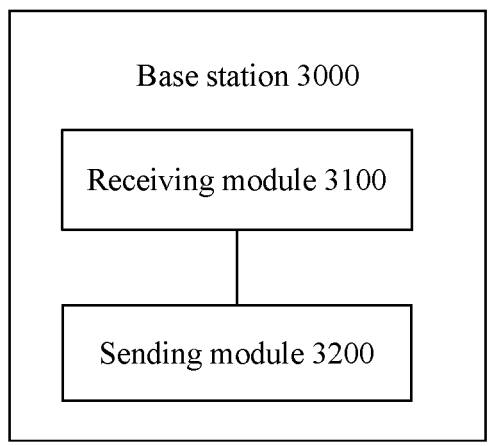
FIG. 14 is a schematic block diagram of a base station according to an embodiment of the present invention.

FIG. 14 shows a base station 3000 according to an embodiment of the present invention. As shown in FIG. 14, the base station 3000 includes a receiving module 3100 and a sending module 3200.

The receiving module 3100 is configured to receive correction information sent by a server. The correction information is determined according to an RTK observation value obtained by a CORS system.

The sending module 3200 is configured to send the correction information to a mobile terminal, so that the mobile terminal corrects, according to the correction information, positioning information obtained from a positioning system by the mobile terminal, to determine a location of the mobile terminal.

Optionally, the sending module 3200 is specifically configured to send a cell broadcast message, where the cell broadcast message carries the correction information, so that the mobile terminal corrects, according to the correction information, the positioning information obtained from the positioning system by the mobile terminal, to determine the location of the mobile terminal.

Optionally, the cell broadcast message includes a SIB message.

The base station 3000 according to this embodiment of the present invention may be corresponding to the base station in the positioning method 900 in a mobile network according to the embodiments of the present invention. In addition, the modules in the base station 3000 and the foregoing other operations and/or functions are separately intended to implement corresponding procedures of the methods in FIG. 2 to FIG. 12. For brevity, details are not described herein.

According to the base station in this embodiment of the present invention, a server is connected to a CORS system, to obtain correction information; and the correction information is forwarded to a mobile terminal, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 15:
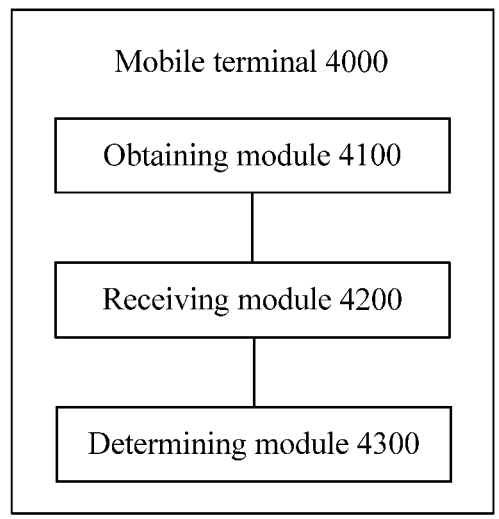
FIG. 15 is a schematic block diagram of a mobile terminal according to an embodiment of the present invention.

FIG. 15 is a schematic block diagram of a mobile terminal 4000 according to an embodiment of the present invention. As shown in FIG. 15, the mobile terminal 4000 includes an obtaining module 4100, a receiving module 4200, and a determining module 4300.

The obtaining module 4100 is configured to obtain positioning information for the mobile terminal 4000 from a positioning system.

The receiving module 4200 is configured to receive correction information sent by a base station. The correction information is determined according to a real-time kinematic observation value.

The determining module 4300 is configured to correct, according to the correction information received by the receiving module 4200, the positioning information obtained by the obtaining module 4200, to determine a location of the mobile terminal.

The mobile terminal 4000 according to this embodiment of the present invention may be corresponding to the mobile terminal in the positioning method in a mobile network in the embodiments of the present invention. In addition, the modules in the mobile terminal 4000 and the foregoing other operations and/or functions are separately intended to implement corresponding procedures of the methods in FIG. 2 to FIG. 12. For brevity, details are not described herein.

The mobile terminal in this embodiment of the present invention receives correction information from a base station, and corrects positioning information obtained from a positioning system, to determine high-precision positioning information of the mobile terminal. Therefore, a requirement of massive mobile users for high-precision positioning is met.

Figure 16:
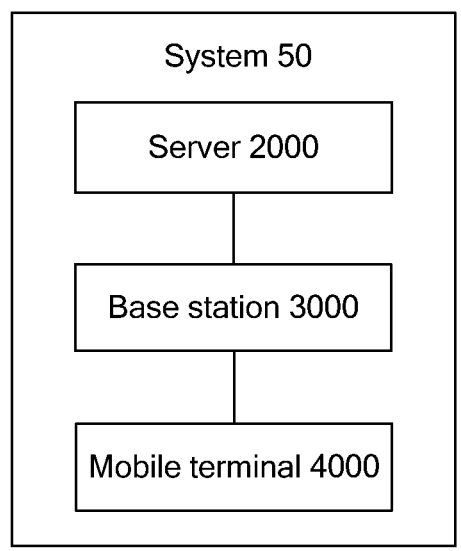
FIG. 16 is a schematic block diagram of a system according to an embodiment of the present invention.

FIG. 16 is a schematic block diagram of a system 50 according to an embodiment of the present invention. As shown in FIG. 16, the system 50 includes:

a server 2000, configured to: obtain first location information, and obtain correction information for a base station according to the first location information, to send the correction information to the base station, where the first location information is used to indicate a location of the base station, and the correction information is determined according to a real-time kinematic RTK observation value obtained by a continuously operating reference stations CORS system;

a base station 3000, configured to: receive the correction information, and forward the correction information to a mobile terminal; and a mobile terminal 4000, configured to: obtain the positioning information from the positioning system, receive the correction information sent by the base station, and correct the positioning information according to the correction information, to determine a location of the mobile terminal.

The server 2000, the base station 3000, and the mobile terminal 4000 in the system 50 according to this embodiment of the present invention may be corresponding to the server, the base station, and the mobile terminal in the positioning methods in a mobile network according to the embodiments of the present invention. In addition, the server 2000, the base station 3000, and the mobile terminal 4000 in the system 50 and the foregoing other operations and/or functions are separately intended to implement corresponding procedures of the methods in FIG. 2 to FIG. 12. For brevity, details are not described herein.

According to the system in this embodiment of the present invention, a server is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 17:
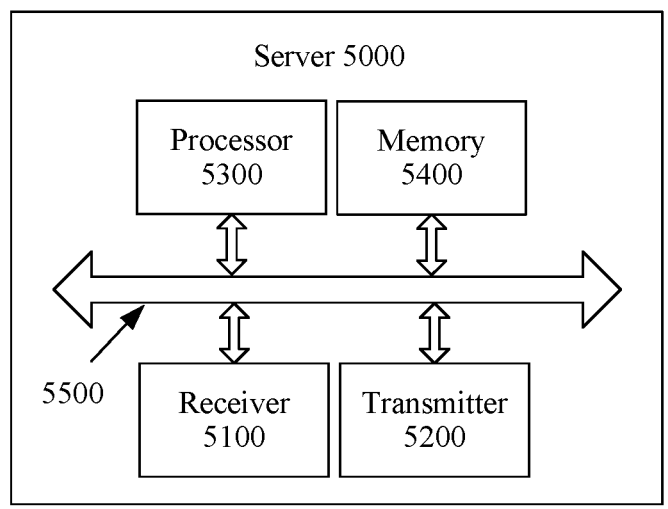
FIG. 17 is a schematic block diagram of a server according to another embodiment of the present invention.

FIG. 17 is a schematic block diagram of a server 5000 according to another embodiment of the present invention. As shown in FIG. 17, the server 5000 includes: a receiver 5100, a transmitter 5200, a processor 5300, a memory 5400, and a bus system 5500. The receiver 5100, the transmitter 5200, the processor 5300, and the memory 5400 are connected to each other by using the bus system 5500. The memory 5400 is configured to store an instruction. The processor 5300 is configured to execute the instruction stored in the memory 5400, so as to control the receiver 5100 to receive a signal and control the transmitter 5200 to send a signal.

The processor 5300 is configured to: obtain first location information, where the first location information is used to indicate a location of a base station, and obtain correction information for the base station according to the first location information. The correction information is determined according to a real-time kinematic observation value RTK observation value obtained by a continuously operating reference stations CORS system.

The transmitter 5200 is configured to send the correction information to the base station, so that the base station forwards the correction information to a mobile terminal, and the mobile terminal corrects, according to the correction information, positioning information obtained from a positioning system by the mobile terminal, to determine a location of the mobile terminal.

The server in this embodiment of the present invention is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

It should be understood that, in this embodiment of the present invention, the processor 5300 may be a central processing unit (CPU), or the processor 5300 may be another general purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general purpose processor may be a microprocessor, or the processor may be any conventional processor or the like.

The memory 5400 may include a read-only memory and a random access memory, and provides an instruction and data for the processor 5300. A part of the memory 5400 may further include a nonvolatile random access memory. For example, the memory 5400 may further store information about a device type.

In addition to a data bus, the bus system 5500 may include a power bus, a control bus, a status signal bus, and the like. However, for clarity of description, various buses are marked as the bus system 5500 in the figure.

In an implementation process, the steps in the foregoing methods may be completed by using an integrated logic circuit of hardware in the processor 5300 or an instruction in a form of software. Steps of the positioning methods disclosed with reference to the embodiments of the present invention may be directly performed and completed by a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 5400. The processor 5300 reads information in the memory 5400, and completes the steps of the foregoing methods in combination with hardware of the processor 5300. To avoid repetition, details are not described herein.

Optionally, the correction information includes a Master-Auxiliary Concept MAC unit differential correction.

The processor 5300 is configured to determine, according to the first location information, a MAC unit to which the base station belongs in the CORS system.

The receiver 5100 is configured to receive a MAC unit differential correction set sent by the CORS system. The MAC unit differential correction set includes multiple MAC unit differential corrections, and each of the multiple MAC unit differential corrections carries location information of a unit that the MAC unit differential correction is for.

The processor 5300 is further configured to determine a MAC unit differential correction for the MAC unit from the MAC unit differential correction set according to the MAC unit.

The transmitter 5200 is specifically configured to send the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Optionally, the correction information includes a MAC unit differential correction.

The processor 5300 is configured to determine, according to the first location information, a MAC unit to which the base station belongs in the CORS system.

The receiver 5100 is configured to receive an RTK observation value set sent by the CORS system. The RTK observation value set includes multiple RTK observation values, and each of the multiple RTK observation values carries location information of a location that the RTK observation value is for.

The processor 5300 is specifically configured to determine the MAC unit differential correction according to a target RTK observation value.

The transmitter 5200 is specifically configured to send the MAC unit differential correction to the base station, so that the base station forwards the MAC unit differential correction to the mobile terminal, and the mobile terminal corrects, according to the MAC unit differential correction, the positioning information obtained from the positioning system by the mobile terminal, to determine the location of the mobile terminal.

Optionally, the correction information includes a first virtual reference station VRS differential correction. The first location information includes location information of a first base station.

The transmitter 5200 is further configured to send a request message to the CORS system. The request message is used for requesting a first VRS differential correction for the first base station from the CORS system, and the request message carries the location information of the first base station.

The receiver 5100 is configured to receive the first VRS differential correction sent by the CORS system. The first VRS differential correction is determined by the CORS system according to the location information of the first base station and the RTK observation value.

The transmitter 5200 is specifically configured to send the first VRS differential correction to the first base station, so that the base station forwards the first VRS differential correction to the mobile terminal, and the mobile terminal corrects, according to the first VRS differential correction, the positioning information obtained from the positioning system by the mobile terminal, to determine the location of the mobile terminal.

Optionally, the correction information further includes a second VRS differential correction. The first location information further includes location information of a second base station.

The processor 5300 is specifically configured to: determine, according to the location information of the second base station, at least three target first base stations that are the closest to the second base station; and determine the second VRS differential correction according to at least three first VRS differential corrections for the at least three target first base stations, where each of the at least three target first base stations is in one-to-one correspondence with each of the at least three first VRS differential corrections.

The transmitter 5200 is specifically configured to send the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the mobile terminal.

Optionally, the correction information includes a VRS differential correction.

The receiver 5100 is further configured to receive an RTK observation value set sent by the CORS system. The RTK observation value set includes multiple RTK observation values, and each of the multiple RTK observation values carries location information of a location that the RTK observation value is for.

The processor 5300 is specifically configured to: determine at least three target RTK observation values for the base station from the RTK observation value set according to the first location information, and determine the VRS differential correction according to the at least three target RTK observation values.

The transmitter 5200 is specifically configured to send the VRS differential correction to the base station, so that the base station forwards the VRS differential correction to the mobile terminal, and the mobile terminal corrects, according to the VRS differential correction, the positioning information obtained from the positioning system by the mobile terminal, to determine the location of the mobile terminal.

The server 5000 according to this embodiment of the present invention may be corresponding to servers in the positioning methods in a mobile network in the embodiments of the present invention. In addition, the modules in the server 5000 and the foregoing other operations and/or functions are separately intended to implement corresponding procedures of the methods in FIG. 2 to FIG. 12. For brevity, details are not described herein.

The server in this embodiment of the present invention is connected to a CORS system, to obtain correction information; and the correction information is forwarded to a mobile terminal by using a base station, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 18:
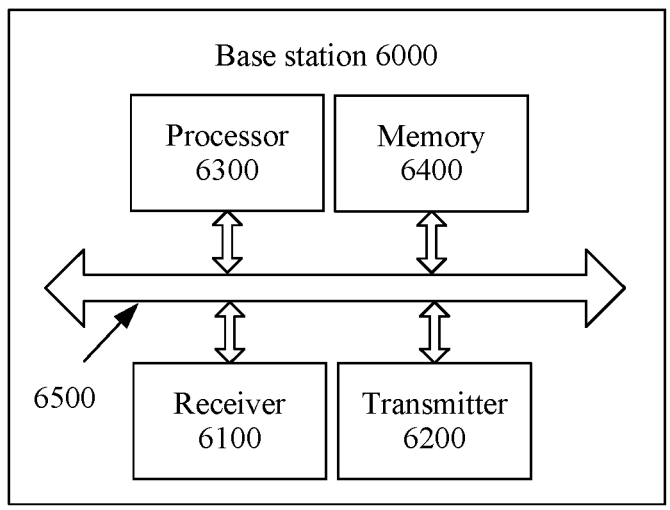
FIG. 18 is a schematic block diagram of a base station according to another embodiment of the present invention.

FIG. 18 shows a base station 6000 according to another embodiment of the present invention. As shown in FIG. 18, the base station 6000 includes: a receiver 6100, a transmitter 6200, a processor 6300, a memory 6400, and a bus system 6500. The receiver 6100, the transmitter 6200, the processor 6300, and the memory 6400 are connected to each other by using the bus system 6500. The memory 6400 is configured to store an instruction. The processor 6300 is configured to execute the instruction stored in the memory 6400, so as to control the receiver 6100 to receive a signal and control the transmitter 6200 to send a signal.

The receiver 6100 is configured to receive correction information sent by a server. The correction information is determined according to an RTK observation value obtained by a CORS system.

The transmitter 6200 is configured to send the correction information to a mobile terminal, so that the mobile terminal corrects, according to the correction information, positioning information obtained from a positioning system by the mobile terminal, to determine a location of the mobile terminal.

Optionally, the transmitter 6200 is specifically configured to send a cell broadcast message, where the cell broadcast message carries the correction information, so that the mobile terminal corrects, according to the correction information, the positioning information obtained from the positioning system by the mobile terminal, to determine the location of the mobile terminal.

Optionally, the cell broadcast message includes a SIB message.

The base station 6000 according to this embodiment of the present invention may be corresponding to the base station in the positioning method 900 in a mobile network according to the embodiments of the present invention. In addition, the modules in the base station 6000 and the foregoing other operations and/or functions are separately intended to implement corresponding procedures of the methods in FIG. 2 to FIG. 12. For brevity, details are not described herein.

According to the base station in this embodiment of the present invention, a server is connected to a CORS system, to obtain correction information; and the correction information is forwarded to a mobile terminal, so that the mobile terminal corrects, according to the correction information, positioning information obtained from a positioning system by the mobile terminal, to determine high-precision positioning information of the mobile terminal. Therefore, a requirement of massive mobile users for high-precision positioning is met.

Figure 19:
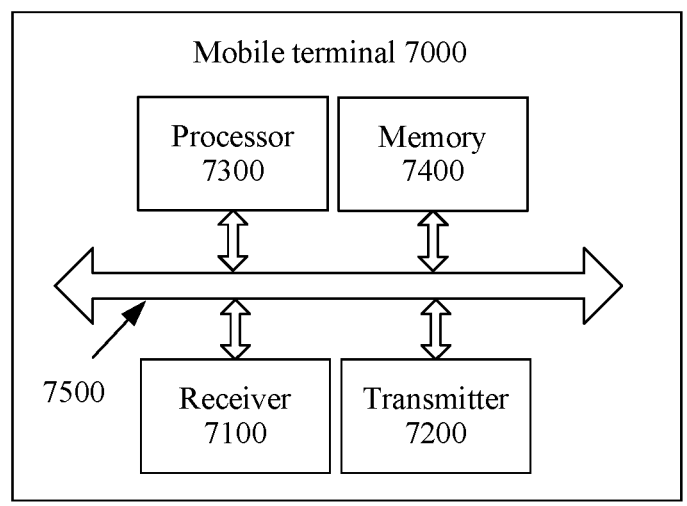
FIG. 19 is a schematic block diagram of a mobile terminal according to another embodiment of the present invention.

FIG. 19 is a schematic block diagram of a mobile terminal 7000 according to another embodiment of the present invention. As shown in FIG. 19, the mobile terminal 7000 includes: a processor 7100, a transmitter 7200, a receiver 7300, a memory 7400, and a bus system 7500. The processor 7100, the transmitter 7200, the receiver 7300, and the memory 7400 are connected to each other by using the bus system 7500. The memory 7400 is configured to store an instruction. The processor 7100 is configured to execute the instruction stored in the memory 7400, so as to control the receiver 7300 to receive a signal and control the transmitter 7200 to send a signal.

The processor 7100 is configured to obtain positioning information for the mobile terminal 7000 from a positioning system.

The receiver 7300 is configured to receive correction information sent by a base station. The correction information is determined according to a real-time kinematic observation value.

The processor 7100 is further configured to correct, according to the correction information received by the receiver 7300, the positioning information obtained by the processor 7100, to determine a location of the mobile terminal.

The mobile terminal 7000 according to this embodiment of the present invention may be corresponding to the mobile terminal in the positioning method in a mobile network in the embodiments of the present invention. In addition, the modules in the mobile terminal 7000 and the foregoing other operations and/or functions are separately intended to implement corresponding procedures of the methods in FIG. 2 to FIG. 12. For brevity, details are not described herein.

The mobile terminal in this embodiment of the present invention receives correction information from a base station, and corrects positioning information obtained from a positioning system, to determine high-precision positioning information of the mobile terminal. Therefore, a requirement of massive mobile users for high-precision positioning is met.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not constitute any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning method in a mobile network, comprising:
obtaining, by a server, first location information of a first base station;
obtaining, by the server, correction information for the first base station according to the first location information, wherein the correction information is determined according to a real-time kinematic (RTK) observation value obtained by a continuously operating reference stations (CORS) system, wherein the first location information comprises location information of the first base station, and the correction information comprises a first virtual reference station (VRS) differential correction, wherein the obtaining, by the server, correction information for the first base station according to the first location information comprises:

sending, by the server, a request message to the CORS system, wherein the request message is used for requesting the first VRS differential correction for the first base station from the CORS system, and the request message includes the location information of the first base station; and receiving, by the server, the first VRS differential correction sent by the CORS system, wherein the first VRS differential correction is determined by the CORS system according to the location information of the first base station and the RTK observation value; and sending, by the server, the correction information to the first base station, comprising: sending, by the server, the first VRS differential correction to the first base station, so that the first base station forwards the first VRS differential correction to a mobile terminal, and the mobile terminal corrects, according to the first VRS differential correction, positioning information obtained from a positioning system by the mobile terminal, to determine a location of the mobile terminal, wherein the correction information further comprises a second VRS differential correction, and the first location information further comprises location information of a second base station, wherein the obtaining, by the server, correction information for the first base station according to the first location information further comprises: determining, by the server according to the location information of the second base station, at least three target first base stations that are closest to the second base station; and determining, by the server, the second VRS differential correction according to at least three first VRS differential corrections for the at least three target first base stations, wherein each of the at least three target first base stations is in one-to-one correspondence with each of the at least three first VRS differential corrections; and wherein the sending, by the server, the correction information to the first base station further comprises: sending, by the server, the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the second mobile terminal.

2. The positioning method according to claim 1, wherein the correction information comprises a VRS differential correction, wherein the obtaining, by the server, correction information for the first base station according to the first location information comprises:

determining, by the server, at least three target RTK observation values for the first base station from an RTK observation value set according to the first location information, wherein the RTK observation value set comprises multiple RTK observation values sent by the CORS system to the server, and each of the multiple RTK observation values includes location information of a location that the RTK observation value is for; and determining, by the server, the VRS differential correction according to the at least three target RTK observation values; and wherein the sending, by the server, the correction information to the first base station comprises:

sending, by the server, the VRS differential correction to the first base station, so that the first base station forwards the VRS differential correction to the mobile terminal, and the mobile terminal corrects, according to the VRS differential correction, the positioning information obtained from the positioning system by the mobile terminal, to determine the location of the mobile terminal.

3. A server, comprising:

a processor configured to:

obtain first location information of a first base station, and obtain correction information for the first base station according to the first location information, wherein the correction information is determined according to a real-time kinematic (RTK) observation value obtained by a continuously operating reference stations (CORS) system, wherein the first location information comprises location information of the first base station, and the correction information comprises a first virtual reference station (VRS) differential correction, wherein the obtaining, by the server, correction information for the first base station according to the first location information comprises:

a transmitter configured to send a request message to the CORS system, wherein the request message is used for requesting the first VRS differential correction for the first base station from the CORS system, and the request message includes the location information of the first base station;

wherein the processor is coupled to a receiver, the receiver configured to receive the first VRS differential correction sent by the CORS system, wherein the first VRS differential correction is determined by the CORS system according to the location information of the first base station and the RTK observation value; and wherein the transmitter is further configured to send the first VRS differential correction to the first base station, so that the first base station forwards the first VRS differential correction to a mobile terminal, and the mobile terminal corrects, according to the first VRS differential correction, positioning information obtained from a positioning system by the mobile terminal, to determine a location of the mobile terminal, wherein the correction information further comprises a second VRS differential correction, wherein the processor is further configured to: determine, according to a location of a second base station, at least three target first base stations that are the closest to the second base station, determine the second VRS differential correction according to at least three first VRS differential corrections for the at least three target first base stations, wherein each of the at least three target first base stations is in one-to-one correspondence with each of the at least three first VRS differential corrections, and wherein the first VRS differential correction is determined by the CORS system according to the location information of the first base station and the RTK observation value, and, wherein the transmitter is further configured to send the second VRS differential correction to the second base station, so that the second base station forwards the second VRS differential correction to a second mobile terminal, and the second mobile terminal corrects, according to the second VRS differential correction, positioning information obtained from the positioning system by the second mobile terminal, to determine the location of the second mobile terminal.

4. The server according to claim 3, wherein the correction information comprises a VRS differential correction, and wherein:
- the receiver is configured to receive an RTK observation value set sent by the CORS system, wherein the RTK observation value set comprises multiple RTK observation values, and each of the multiple RTK observation values carries location information of a location that the RTK observation value is for; and
- the processor is further configured to:
- determine at least three target RTK observation values for the location of the first base station from the RTK observation value set according to the location of the first base station, and
- determine the VRS differential correction according to the at least three target RTK observation values,
- wherein the transmitter is further configured to send the VRS differential correction to the first base station, so that the first base station forwards the VRS differential correction to the mobile terminal, and the mobile terminal corrects, according to the VRS differential correction, the positioning information obtained from the positioning system by the mobile terminal, to determine the location of the mobile terminal.

* * * * *